US012809700B2

(12) United States Patent
Yoshinaga et al.

(10) Patent No.: US 12,809,700 B2
(45) Date of Patent: Nov. 24, 2026

(54) DATA PROCESSING APPARATUS WITH PROCESSING NODE TRANSITION CONTROL AND METHOD THEREOF

(71) Applicant: CANON KABUSHIKI KAISHA, Tokyo (JP)

(72) Inventors: Motoki Yoshinaga, Kanagawa (JP); Kinya Osa, Tokyo (JP); Masami Kato, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 583 days.

(21) Appl. No.: 18/305,936

(22) Filed: Apr. 24, 2023

(65) Prior Publication Data

US 2023/0342230 A1 Oct. 26, 2023

(30) Foreign Application Priority Data

Apr. 26, 2022 (JP) ................................ 2022-072781

(51) Int. Cl.
*G06F 9/50* (2006.01)
*G06F 9/54* (2006.01)
*G06F 11/34* (2006.01)

(52) U.S. Cl.
CPC .......... *G06F 9/544* (2013.01); *G06F 11/3409* (2013.01)

(58) Field of Classification Search
CPC .... G06F 9/544; G06F 11/3409; G06F 9/5033; G06N 3/082; G06N 3/0464; G06N 3/063
(Continued)

(56) References Cited

U.S. PATENT DOCUMENTS

2011/0239224 A1* 9/2011 Yamamoto ............... G06N 3/08 718/104
2023/0071424 A1* 3/2023 Kibardin .................. G06F 9/54

FOREIGN PATENT DOCUMENTS

JP 5171118 A 3/2013

OTHER PUBLICATIONS

Tao et al. "Unsupervised-Restricted Deconvolutional Neural Network for Very High Resolution Remote-Sensing Image Classification" IEEE Transactions on Geoscience and Remote Sensing, vol. 55, No. 12, Dec. 2017, (Year: 2017).*

(Continued)

*Primary Examiner* — Pierre Vital
*Assistant Examiner* — Abdou K Seye
(74) *Attorney, Agent, or Firm* — Canon U.S.A., Inc. IP Division

(57) ABSTRACT

A data processing apparatus comprises one or more memories storing instructions and one or more processors that, upon execution of the instructions, are configured to sequentially perform processing of data by a plurality of hierarchically connected processing nodes, store, in the one or more memories, processing results of the plurality of respective processing nodes, and processing statuses of and parameters for the plurality of respective processing nodes, the parameters being used determine a processing node to perform the processing, cyclically specify processing nodes, from among the plurality of processing nodes, to perform the processing in an order based on hierarchy, determine whether the processing by a specified processing node is performable based on the stored processing statuses, and determine a processing node to perform the processing based on a result of determination and the stored parameter for the specified processing node.

19 Claims, 19 Drawing Sheets

(58) Field of Classification Search
USPC .......................................................... 719/320
See application file for complete search history.

(56) References Cited

OTHER PUBLICATIONS

Govindan Ravindran et al. “A Performance Comparison of Hierarchical Ring- and Mesh-connected Multiprocessor Networks”, 1997 IEEE (Year: 1997).*

* cited by examiner

DATA PROCESSING APPARATUS WITH PROCESSING NODE TRANSITION CONTROL AND METHOD THEREOF

BACKGROUND

Field

The present disclosure relates to a data processing apparatus that sequentially performs processing of data by a plurality of processing nodes, and a method thereof.

Description of the Related Art

A hardware implementation technique for efficiently processing convolutional neural networks (CNNs) with reduced circuit scale is desired. The CNN is known as a method for use in deep learning, and provides excellent performance mainly in tasks such as image recognition.

One of the obstacles to improving recognition performance while reducing the circuit scale of CNN calculation processing hardware is an increase in the usage of memory for storing feature data (hereinafter, referred to as a feature data memory). In the case of the CNN, feature data refers to the result of convolution calculation in each layer. A calculating formula for determining an i-th piece of feature data in a next layer (L+1), or $X^{L+1}_i$, from pieces of feature data in a layer L, or $X^L_0$, $X^L_1$, $X^L_2$, . . . , $X^L_{N-1}$ is expressed by the following Eq. (1):

$$X_i^{L+1} = \phi\left(\sum_{j=0}^{N-1}\left(W_{i,j}^L * X_j^L\right) + b_i^L\right) \quad (1)$$

In Eq. (1), $W^L_{i,j}$ is a convolution filter coefficient (hereinafter, referred to simply as a coefficient), and $b^L_i$ is a bias term. Moreover, * represents a convolution calculation, and φ an activation function. If the processing expressed by Eq. (1) is performed by hardware one layer at a time, input values $X^L_0$, $X^L_1$, $X^L_2$, . . . $X^L_{N-1}$ are desirably held in the feature data memory until output values $X^{L+1}_0$, $X^{L+1}_1$, $X^{L+1}_2$, . . . , $X^{L+1}_{N-1}$ are all output. For that purpose, a memory area is desirably reserved as much as the maximum value of the sum of the feature data sizes of input- and output-side layers throughout the network.

Japanese Patent No. 5171118 discusses dividing feature data into lines and processing the feature data in units of lines instead of processing the feature data layer by layer. Subsequent layers are processed by priority, and the feature data in each layer is held in a ring buffer (line buffer).

In other words, instead of holding all the lines in the feature data memory, only lines possible to be used for subsequent calculations are held in the ring buffers, and used lines are overwritten and discarded in succession. This can reduce the memory usage as compared with the case of holding all the lines in the feature data memory during layer-by-layer processing.

If, like Japanese Patent No. 5171118, feature data is held using ring buffers, it is important to maintain the numbers of lines held in the respective layers constant. More specifically, an existing line is desirably discarded each time a new line is held in each layer. In the method for cyclically processing the layers thus one line at a time, a line of the next layer is processed immediately after a line of the current layer is held. A line can thus be discarded from the current layer as a used line.

However, the method for cyclically processing the layers as discussed in Japanese Patent No. 5171118 is unable to maintain the numbers of lines held in the ring buffers constant depending on the network configuration. For example, in a case where two lines of the next layer are processed to discard a line of feature data from the current layer, the numbers of lines held in the ring buffers are unable to be maintained constant.

SUMMARY

According to an aspect of the present disclosure, a data processing apparatus comprises one or more memories storing instructions and one or more processors that, upon execution of the instructions, are configured to sequentially perform processing of data by a plurality of hierarchically connected processing nodes, store, in the one or more memories, processing results of the plurality of respective processing nodes, and processing statuses of and parameters for the plurality of respective processing nodes, the parameters being used determine a processing node to perform the processing, cyclically specify processing nodes, from among the plurality of processing nodes, to perform the processing in an order based on hierarchy, determine whether the processing by a specified processing node is performable based on the stored processing statuses, and determine a processing node to perform the processing based on a result of determination and the stored parameter for the specified processing node.

Further features of the present disclosure will become apparent from the following description of exemplary embodiments with reference to the attached drawings.

DESCRIPTION OF THE EMBODIMENTS

Exemplary embodiments of the present disclosure will be described in detail with reference to the drawings. Configurations described in the following exemplary embodiments are representative examples, and the scope of the present disclosure is not necessarily limited to such specific configurations.

In the exemplary embodiments, the order of processing of layers to be sequentially performed is controlled to maintain the ring buffer sizes of the respective layers constant even if the storing size and discarding size of feature data into/from the ring buffers do not match between the layers.

The processing order of the layers is controlled using two types of information. One is layer-by-layer parameters assigned in advance based on a network structure. The other is the result of determination made about a layer under processing as to whether input layer-side data to be used in calculating feature data is sufficient. The following exemplary embodiments describe how to determine the processing order of the layers based on the parameters assigned to the respective layers or how to control the processing order depending on the result of the determination.

In the first exemplary embodiment, if input-side data for a layer is insufficient, the processing transitions to a specified layer and resumes to process two or more lines of the subsequent stage while processing a line of the preceding layer. By assigning appropriate processing order, the ring buffer sizes of the respective layers are maintained constant even if the storing size and discarding size of feature data into/from the ring buffers do not match between the layers.

Methods for performing processing by a neural network using ring buffers will initially be described, including the method discussed in Japanese Patent No. 5171118. Next, an example of a network configuration will be described where memory usage is difficult to reduce by the method for cyclically processing the layers. Then, a data processing apparatus and method according to the present exemplary embodiment will be described in detail for a case where such a network configuration is used.

In the present exemplary embodiment, the numbers of lines of feature data held in the ring buffers of all the layers are maintained constant, allowing the processing by the neural network with reduced memory usage to be performed by using the following apparatus and method.

<Processing of Neural Network Using Ring Buffers>

Figure 2:
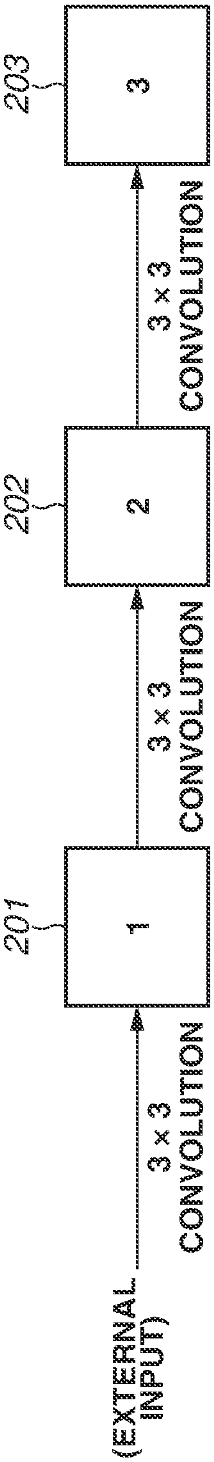
FIG. 2 is a diagram illustrating an example of a simple three-layer network.

FIG. 2 illustrates an example of a simple network processible by the method discussed in Japanese Patent No. 5171118. This network includes three layers, namely, a first layer 201, a second layer 202, and a third layer 203. Each layer is a convolution layer with a kernel size of 3. The third layer 203 is the final output of the network of FIG. 2. The purpose of the network processing is to calculate all the lines of the third layer 203. The first and second layers 201 and 202 are intermediate outputs of the network of FIG. 2. The first and second layers 201 and 202 do not necessarily need to be held at the point in time when the processing of the network of FIG. 2 is completed.

According to the method discussed in Japanese Patent No. 5171118, the overall memory usage is reduced by holding feature data that is the intermediate outputs, i.e., the processing results of the first and second layers 201 and 202 in ring buffers.

Figure 3:
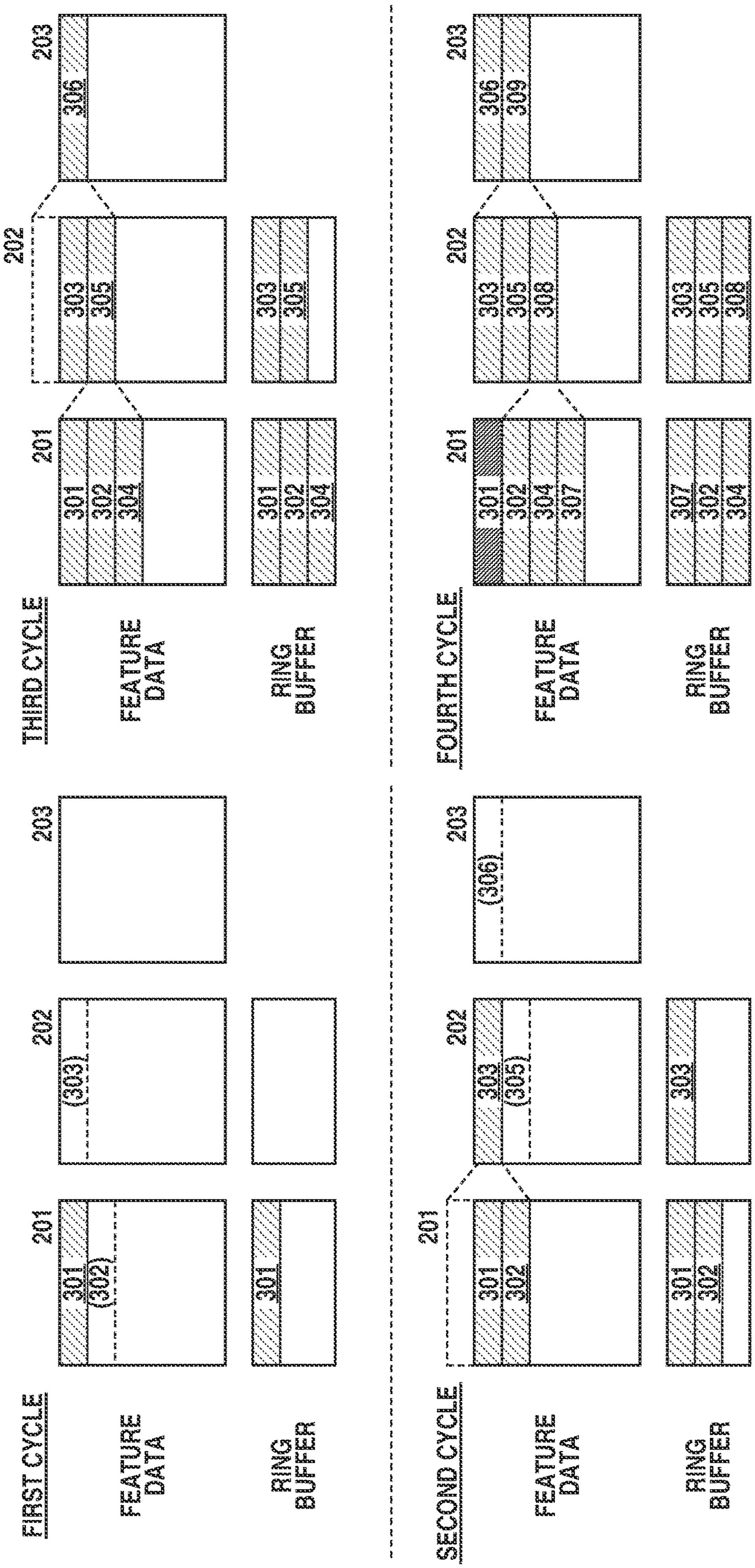
FIG. 3 is a diagram illustrating a procedure for processing the network of FIG. 2.

FIG. 3 illustrates a procedure in processing the network of FIG. 2. In the first cycle, a first line 301 of the first layer 201 is calculated. In the second cycle, a second line 302 of the first layer 201 is initially calculated. This enables calculation of a first line 303 of the second layer 202, and the first line 303 of the second layer 202 is continuously calculated. In the third cycle, a third line 304 of the first layer 201, a second line 305 of the second layer 202, and a first line 306 of the third layer 203 are similarly calculated.

In the fourth cycle, a fourth line 307 of the first layer 201 is initially calculated. Since the calculation of the second line 305 of the second layer 202 has been completed at the beginning of the fourth cycle, the first line 301 of the first layer 201 will not be used for subsequent calculations. The first line 301 of the first layer 201 in the line buffer used as a ring buffer is thus overwritten with the fourth line 307 of the first layer 201. A third line 308 of the second layer 202 and a second line 309 of the third layer 203 are then calculated in order.

A similar procedure is subsequently repeated while overwriting disused lines in the line buffers, whereby the calculation of the entire network can be performed with three lines of memory use per layer.

Figure 4:
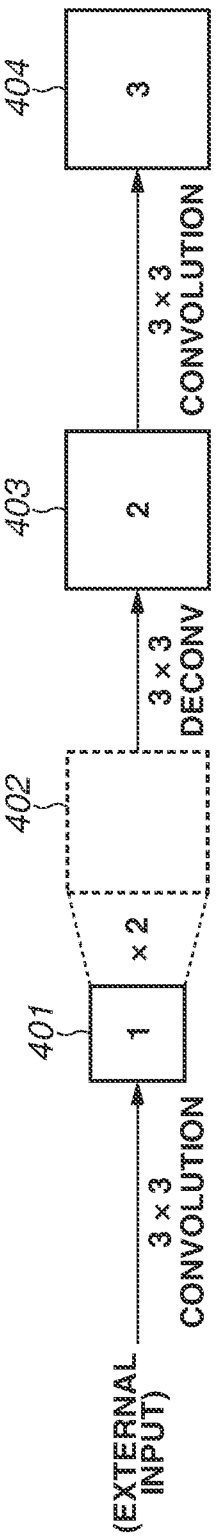
FIG. 4 is a diagram illustrating an example of a three-layer network including a deconvolution (DeConv) layer.

FIG. 4 illustrates an example of a network where the storing size and discarding size of feature data do not match between layers. A difference from the network of FIG. 2 is that a second layer 403 is a deconvolution (DeConv) layer with a kernel size of 3. The DeConv layer expands the feature data in the input layer by upsampling, and performs convolution processing on the expanded feature data. In the case of the network of FIG. 4, the second layer 403 is calculated by performing convolution processing on an apparent first layer 402 obtained by upsampling a first layer 401. The feature data in the apparent first layer 402 can be calculated from the first layer 401 each time.

In other words, if corresponding lines of the first layer 401 are held in the memory, the apparent first layer 402 does not need to be held in the memory.

Figure 5A:
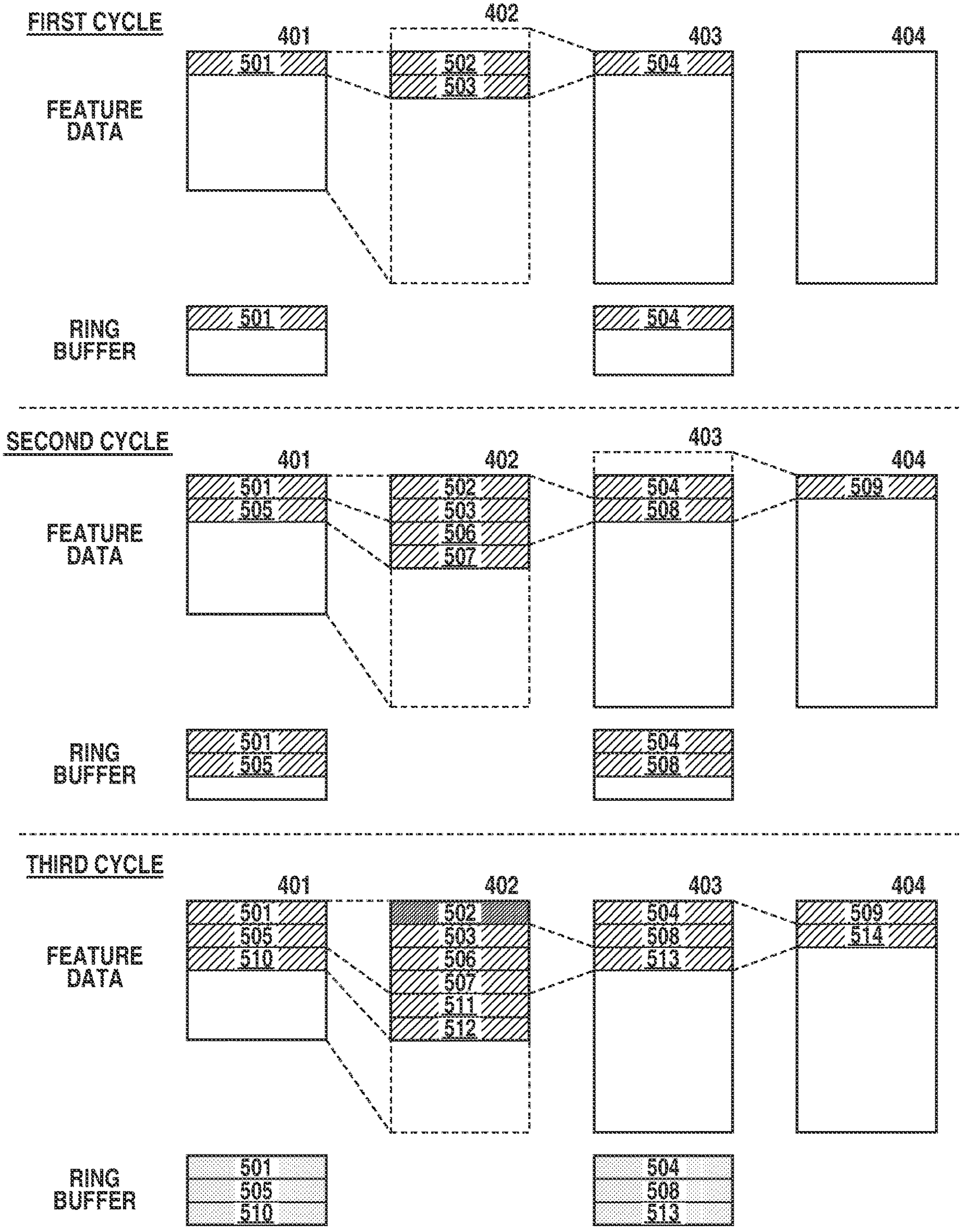
FIGS. 5A and 5B are diagrams illustrating a procedure for processing the network of FIG. 4.
Figure 5B:
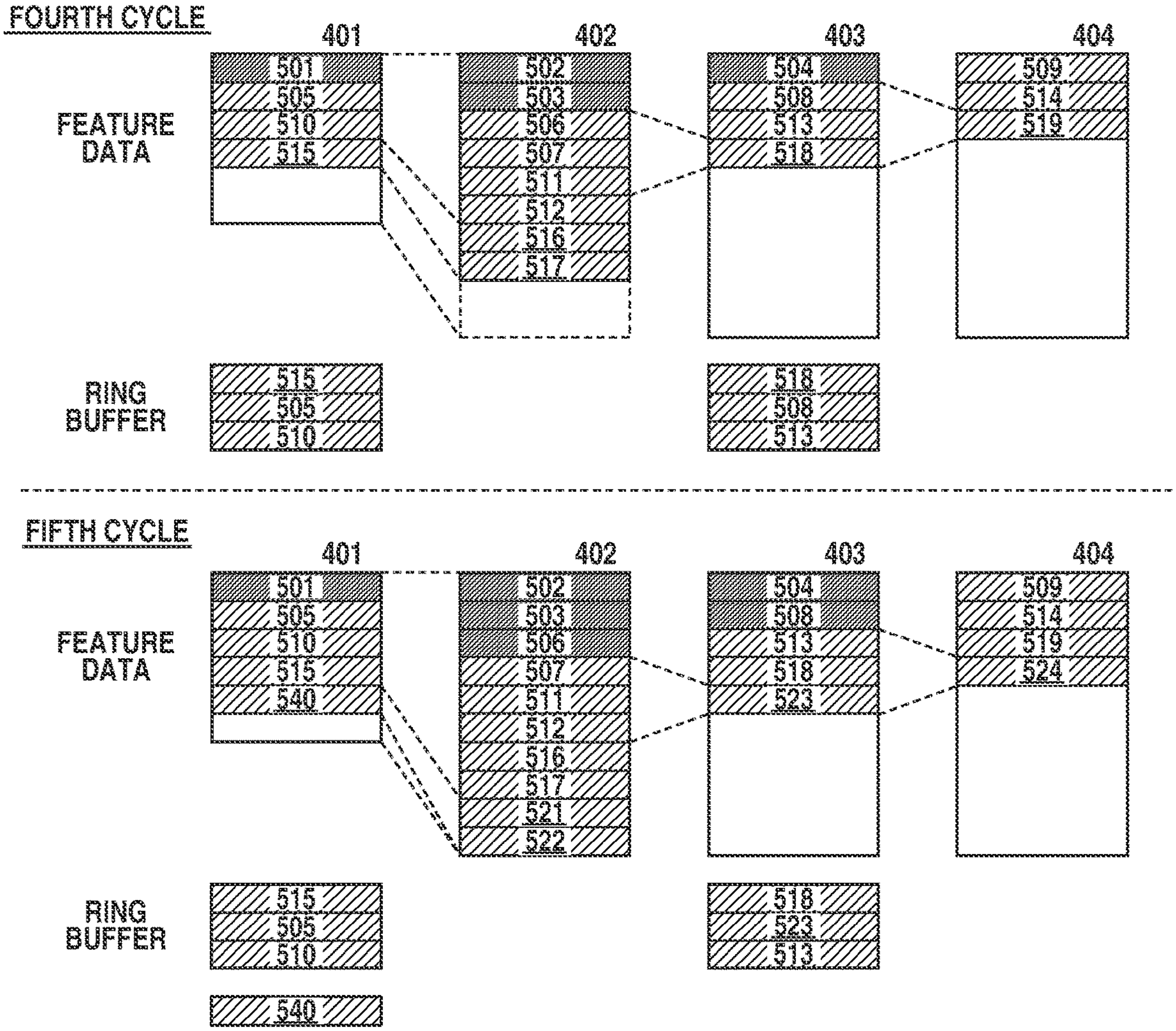

FIGS. 5A and 5B illustrate a procedure in processing the network of FIG. 4. Like FIG. 3, a first line 501 of the first layer 401 is calculated in the first cycle. Calculating the first line 501 of the first layer 401 enables use of two lines, namely, a first line 502 and a second line 503 of the apparent first layer 402 as inputs in calculating the second layer 403. Since the first and second lines 502 and 503 of the apparent first layer 402 can be obtained by upsampling the first line 501 of the first layer 401 each time, the first and second lines 502 and 503 do not need to be held in a line buffer as real data.

With the first line 501 of the first layer 401 calculated in the first cycle, a first line 504 of the second layer 403 can be continuously calculated using the first and second lines 502 and 503 of the apparent first layer 402. In the second cycle, a second line 505 of the first layer 401, a second line 508 of the second layer 403, and a first line 509 of the third layer 404 are similarly calculated in order.

In the third cycle, a third line 510 of the first layer 401, a third line 513 of the second layer 403, and a second line 514 of the third layer 404 are similarly calculated in order. Since the calculation of the second line 508 of the second layer 403 has been completed at the beginning of the third cycle, the first line 502 of the apparent first layer 402 will not be used for subsequent calculations. By contrast, the second line 503 of the apparent first layer 402 can still be used. In such a case, the first line 501 of the first layer 401 that is the source of the second line 503 of the apparent first layer 402 is held in the line buffer until the second line 503 of the apparent first layer 402 is disused.

In the fourth cycle, a fourth line 515 of the first layer 401, a fourth line 518 of the second layer 403, and a third line 519 of the third layer 404 are calculated in order. Since the calculation of the third line 513 of the second layer 403 has been completed at the beginning of the fourth cycle, the second line 503 of the apparent first layer 402 will not be used for subsequent calculations. The first line 501 of the first layer 401 becomes useless at this point in time, and can be overwritten in the line buffer. Here, the first line 501 of the first layer 401 is overwritten with the fourth line 515 of the first layer 401, and the first line 504 of the second layer 403 with the fourth line 518 of the second layer 403.

In the fifth cycle, a fifth line 540 of the first layer 401, a fifth line 523 of the second layer 403, and a fourth line 524 of the third layer 404 are calculated in order. At the beginning of the fifth cycle, the second line 505 of the first layer 401 is held in the ring buffer since the fourth line 507 of the apparent first layer 402 can still be used. The three-line capacity is thus insufficient to hold the fifth line 540 of the first layer 401 in the ring buffer.

In FIGS. 5A and 5B, the ring buffer of the first layer 401 accumulates more lines than that of the second layer 403. The reason is that the first layer 401 calculates a line of feature data at each cycle and the apparent first layer 402 disuses a line at each cycle. In other words, the first layer 401 disuses a line of feature data at every two cycles. Continuing such processing will eventually entail the capacity of the line buffer of the first layer 401 up to approximately one half the total number of lines. This increases the memory usage as compared with the case of FIG. 2.

As described above, the method for cyclically processing the layers is unable to achieve the original purpose of reducing the memory usage if the storing size and discarding size of feature data into/from the ring buffers do not match. To solve such an issue, a data processing apparatus and method according to the present exemplary embodiment described below control transition to a specified layer and resumption of processing if the input-side feature data is insufficient.

<Control of Layer Processing Order>

Figure 6:
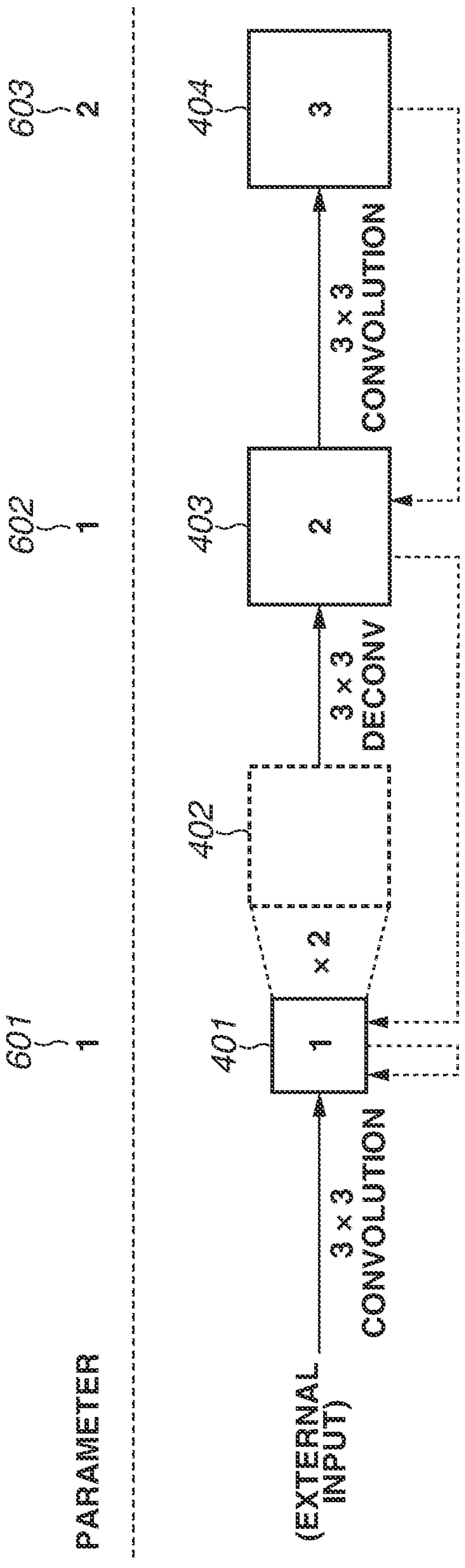
FIG. 6 is a diagram illustrating parameter assignment and layer order control according to the first exemplary embodiment.

FIG. 6 illustrates an example of parameter assignment to the layers and the resulting control of layer processing order in processing the network of FIG. 4 by the data processing apparatus and method according to the present exemplary embodiment. In the first exemplary embodiment, which layer to transition to and perform (resume) next processing at when input layer-side feature data is determined to be insufficient at each layer is assigned in the form of parameters. For example, if a line of the second layer 403 is determined to be incalculable, the data processing apparatus returns to the first layer 401 and resumes processing based on the value "1" of a parameter 602 for the second layer 403. If a line of the third layer 404 is determined to be incalculable, the data processing apparatus returns to the second layer 403 and resumes processing based on the value "2" of a parameter 603 for the third layer 404. Although the lines of the first layer 401 will never be incalculable, a parameter 601 having a value of "1" indicating the first layer 401 is set for the first layer 401 for the sake of convenience.

With such parameter settings, the numbers of times of processing of the second and third layers 403 and 404 can be increased compared with that of the first layer 401. This prevents the number of lines held in the ring buffer of the first layer 401 from exceeding those of the other layers. More specifically, the layer order control is performed so that each time a line of feature data is calculated in the first layer 401, two lines of feature data in the apparent first layer 402 is used by the subsequent processing.

Figure 7A:
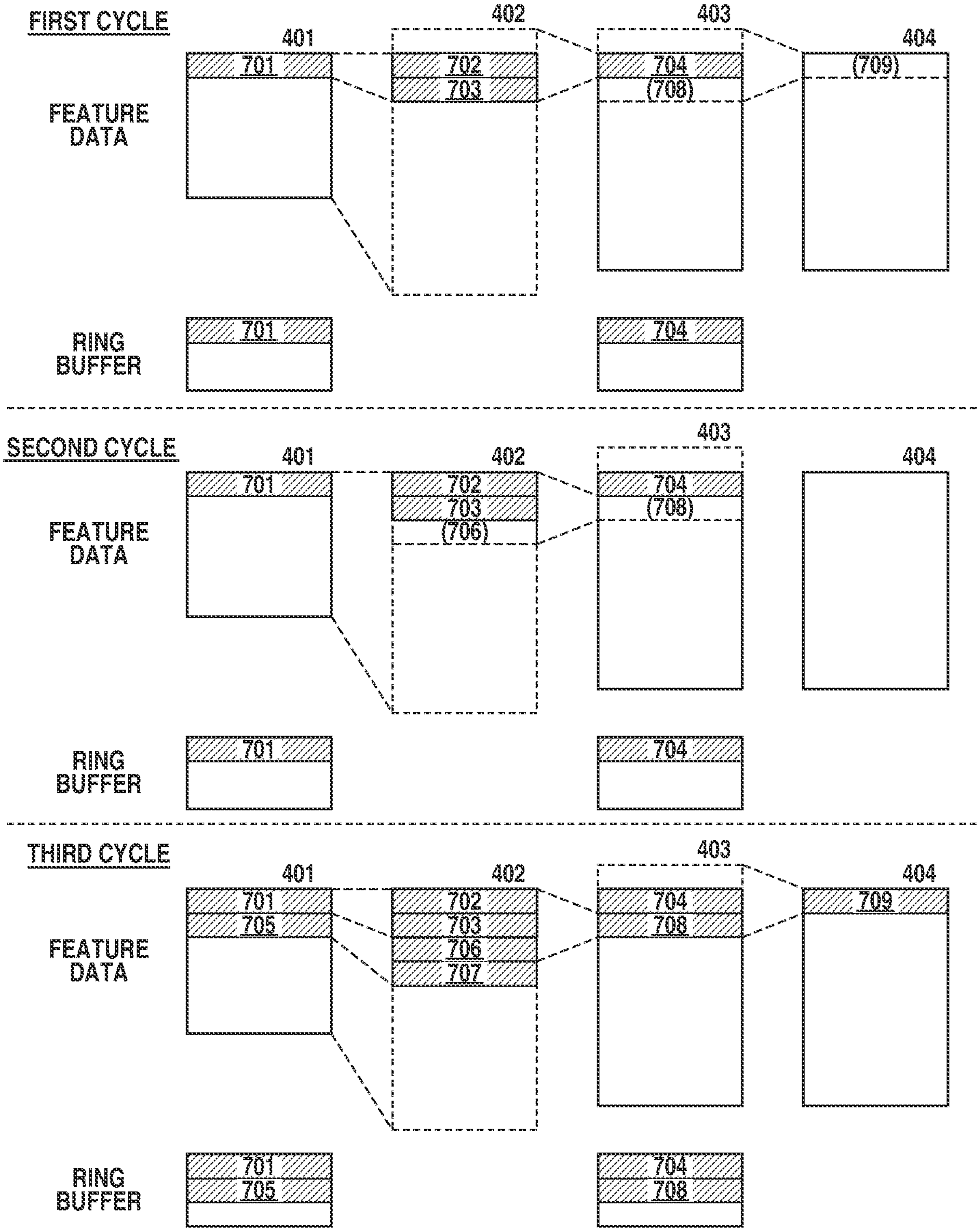
FIGS. 7A to 7C are diagrams illustrating a procedure for processing the network of FIG. 4 according to the first exemplary embodiment.
Figure 7B:
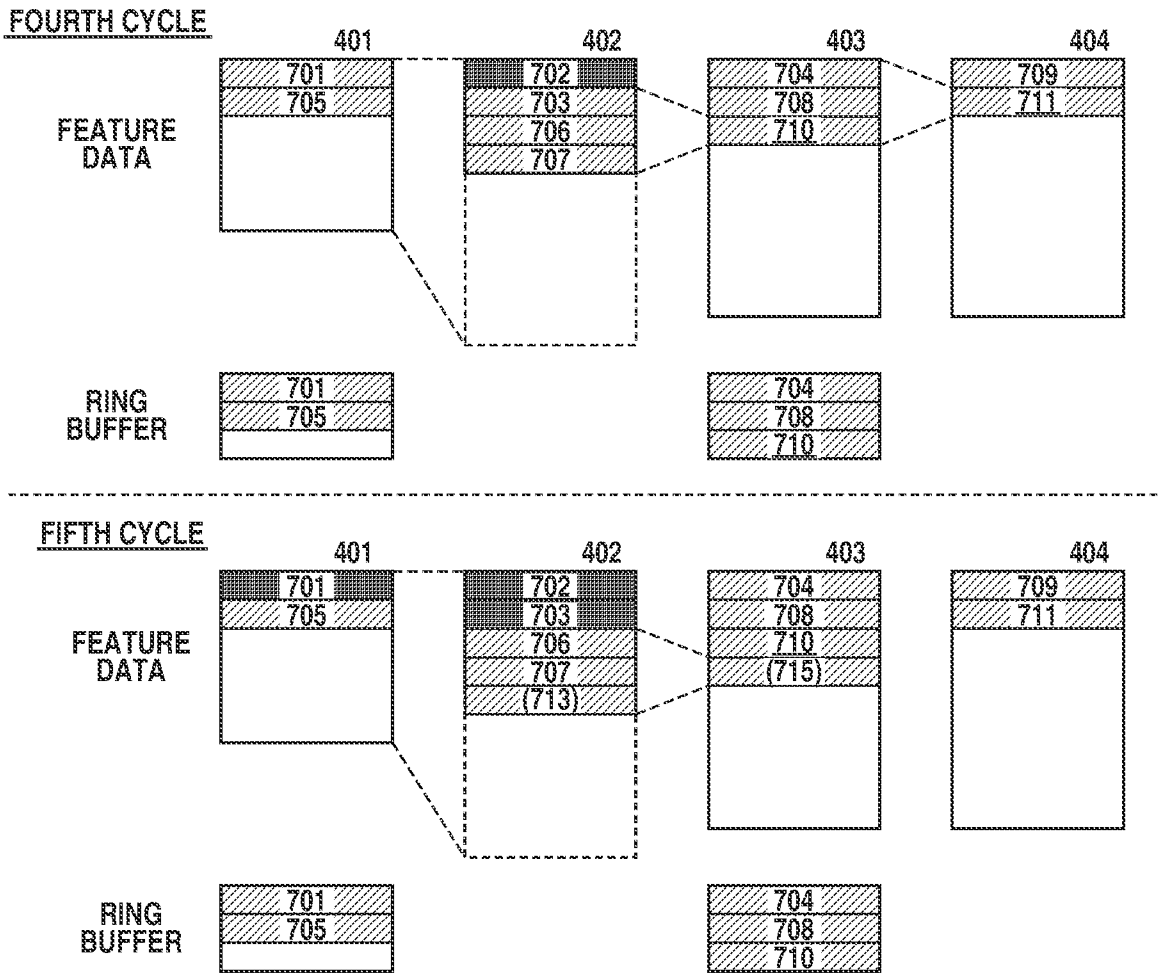
Figure 7C:
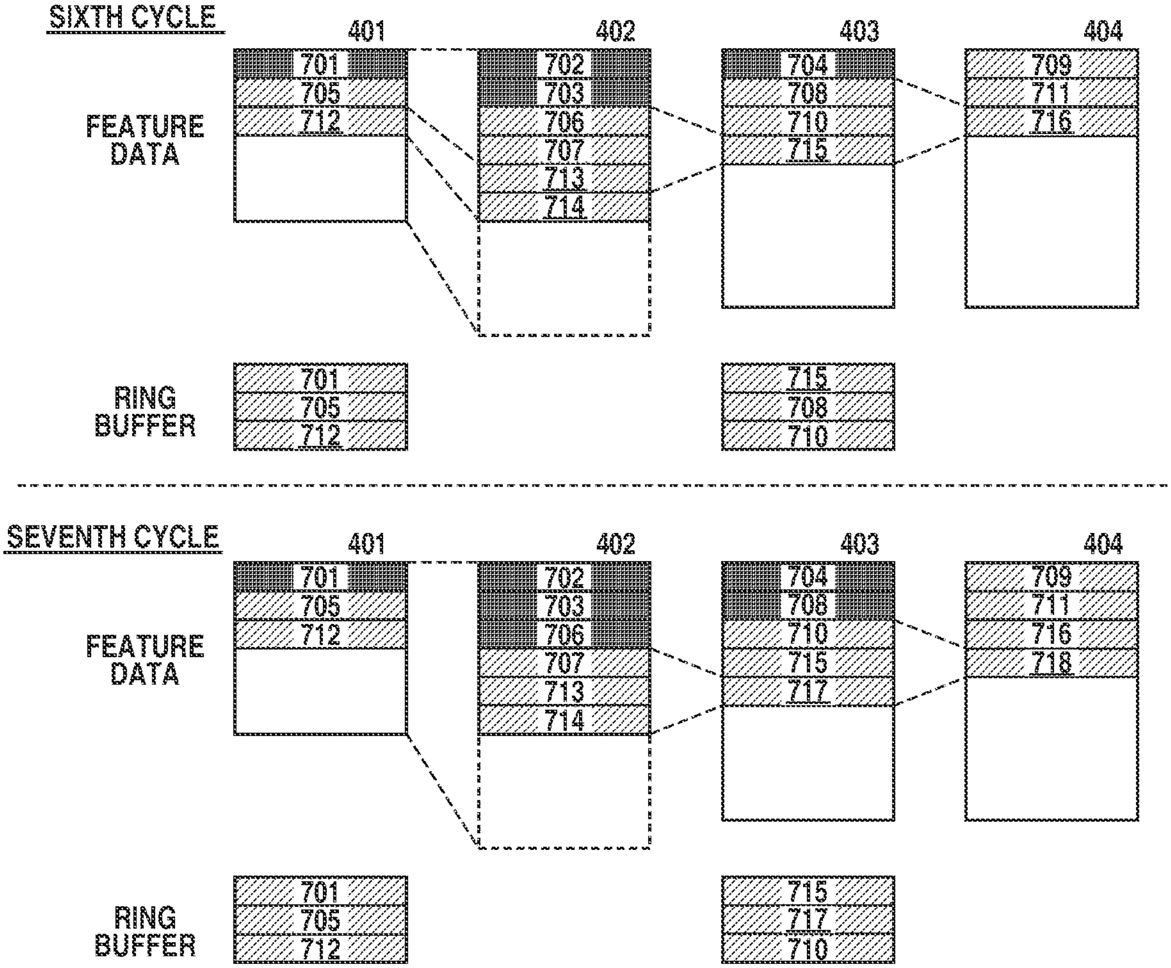

FIGS. 7A to 7C illustrates a procedure in processing the network of FIG. 4 by the control of FIG. 6 according to the first exemplary embodiment. Like FIGS. 5A and 5B, a first line 701 of the first layer 401 and a first line 704 of the second layer 403 are calculated in the first cycle. At this point in time, a first line 709 of the third layer 404 is incalculable since a second line 708 of the second layer 403 has not been calculated. The second cycle is thus resumed at the calculation of the second layer 403 based on the parameter 603 for the third layer 404.

In the second cycle, the calculation of the second line 708 of the second layer 403 is attempted. However, the second line 708 of the second layer 403 is incalculable since a third layer 706 of the apparent first layer 402 has not been calculated at this point in time. The third cycle is thus resumed at the calculation of the first layer 401 based on the parameter 602 for the second layer 403.

In the third cycle, a second line 705 of the first layer 401, the second line 708 of the second layer 403, and the first line 709 of the third layer 404 are calculated. If the third layer 404 that is the last layer is reached, the fourth cycle is resumed at the calculation of the second layer 403 based on the parameter 603 for the third layer 404 as with the case where the line is incalculable.

In the fourth cycle, a third line 710 of the second layer 403 and a second line 711 of the third layer 404 are calculated. Since the third layer 404 that is the last layer is reached like the third cycle, the fifth cycle is resumed at the calculation of the second layer 403.

In the fifth cycle, like the second cycle, the processing returns to the first layer 401 without calculating a line. In the sixth cycle, like the third cycle, three lines, namely, a third layer 712 of the first layer 401, a fourth line 715 of the second layer 403, a third layer 716 of the third layer 404 are calculated. The processing returns to the second layer 403. In the seventh cycle, like the fourth cycle, two lines, namely, a fifth line 717 of the second layer 403 and a fourth layer 718 of the third layer 404 are calculated. The processing returns to the second layer 403.

Subsequently, the first layer 401 is calculated line by line and the second and third layers 403 and 404 in two lines repeatedly in every three cycles. While a line of the first layer 401 is calculated, two lines of the apparent first layer 402 are disused from the calculation of the second layer 403, and a line of the first layer 401 is disused. While two lines of the second layer 403 are calculated, two lines are disused from the calculation of the third layer 404.

As described above, the method illustrated in FIGS. 7A to 7C can process the network of FIG. 4 without overflowing the ring buffer in any of the intermediate layers, i.e., the first and second layers 401 and 403. The network of FIG. 4 can thus be processed with reduced memory usage as with the case of processing the network of FIG. 2 using the method discussed in Japanese Patent No. 5171118.

<Configuration Example of Data Processing Apparatus>

Figure 8:
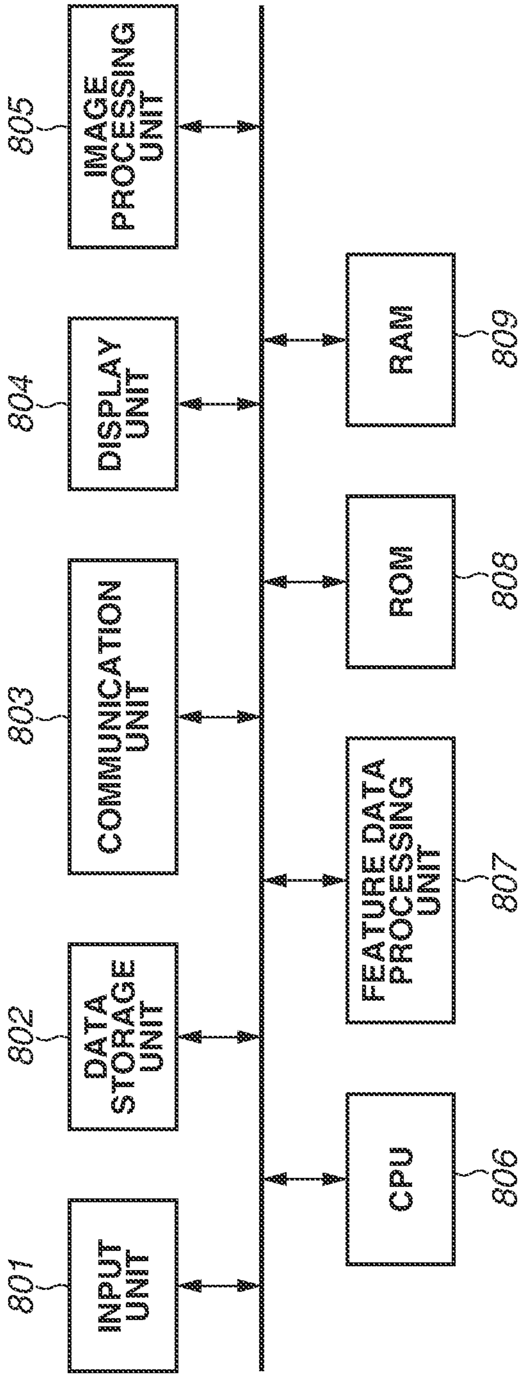
FIG. 8 is a diagram illustrating a configuration example of a data processing apparatus according to the first and second exemplary embodiments.

FIG. 8 is a block diagram illustrating a configuration example of the data processing apparatus for processing a neural network with reduced memory usage according to the present exemplary embodiment.

An input unit 801 is a device for inputting instructions and data from the user. The input unit 801 includes a keyboard, a pointing device, and a button. A display unit 804 to be described below and the input unit 801 may be configured as the same device, like a conventional touchscreen device. In such a case, input to the touchscreen is handled as input to the input unit 801.

A data storage unit 802 is a part for storing image data. The data storage unit 802 typically includes a hard disk, a flexible disk, a compact disc read-only memory (CD-ROM), a compact disc-recordable (CD-R), a digital versatile disc (DVD), a memory card, a CompactFlash (CF) card, a SmartMedia, a Secure Digital (SD) card, a memory stick, an xD-Picture Card, and/or a Universal Serial Bus (USB) memory. Aside from image data, the data storage unit 802 can also store programs and other data. A part of a random access memory (RAM) 809 may be used as the data storage unit 802. The data storage unit 802 may be virtually configured by using a storage device of an apparatus connected via a communication unit 803 to be described below.

A communication unit 803 is an interface (I/F) for implementing communication between devices. In FIGS. 5A and 5B, the input unit 801, the data storage unit 802, and the display unit 804 to be described below are all illustrated to be included in one apparatus. However, such parts may be connected by communication lines of a conventional communication method and configured like this as a whole.

The display unit 804 is a device for displaying images before and after image processing, and graphical user interface (GUI) images. A cathode-ray tube (CRT) or a liquid crystal display is typically used. The display unit 804 may be a display device of an external apparatus connected via a cable.

An image processing unit 805 receives commands from a central processing unit (CPU) 806 to be described below, reads image data written to the data storage unit 802, and makes a range adjustment to the pixel values. The image processing unit 805 writes the processing result into the RAM 809 to be described below.

The CPU 806 controls general operation of the data processing apparatus. The ROM 808 and the RAM 809 provide the CPU 806 with programs, data, and a working area for the processing. If a program to be used for processing to be described below is stored in the data storage unit 802 or the ROM 808, the program is read into the RAM 809 once and then executed. If the data processing apparatus receives the program via the communication unit 803, the program is recorded in the data storage unit 802 once and then read into the RAM 809. The program may be directly read from the communication unit 803 into the RAM 809 and executed. While FIGS. 5A and 5B illustrate a configuration with a single CPU (CPU 806), the data processing apparatus may include a plurality of CPUs.

A feature data processing unit 807 receives commands from the CPU 806 and performs calculation processing using feature data. The feature data processing unit 807 includes a memory to be used in executing the calculation processing.

The ring buffers to hold the lines 701 to 718 of the feature data illustrated in FIGS. 7A to 7C are configured in the memory or the RAM 809. The feature data processing unit 807 reads and writes the feature data in the process of calculation processing.

The system configuration of the data processing apparatus also includes various components other than the foregoing. A description thereof will be omitted since the present exemplary embodiment is not focused on such components.

<Configuration of Data Processing Apparatus According to Present Exemplary Embodiment>

Figure 1:
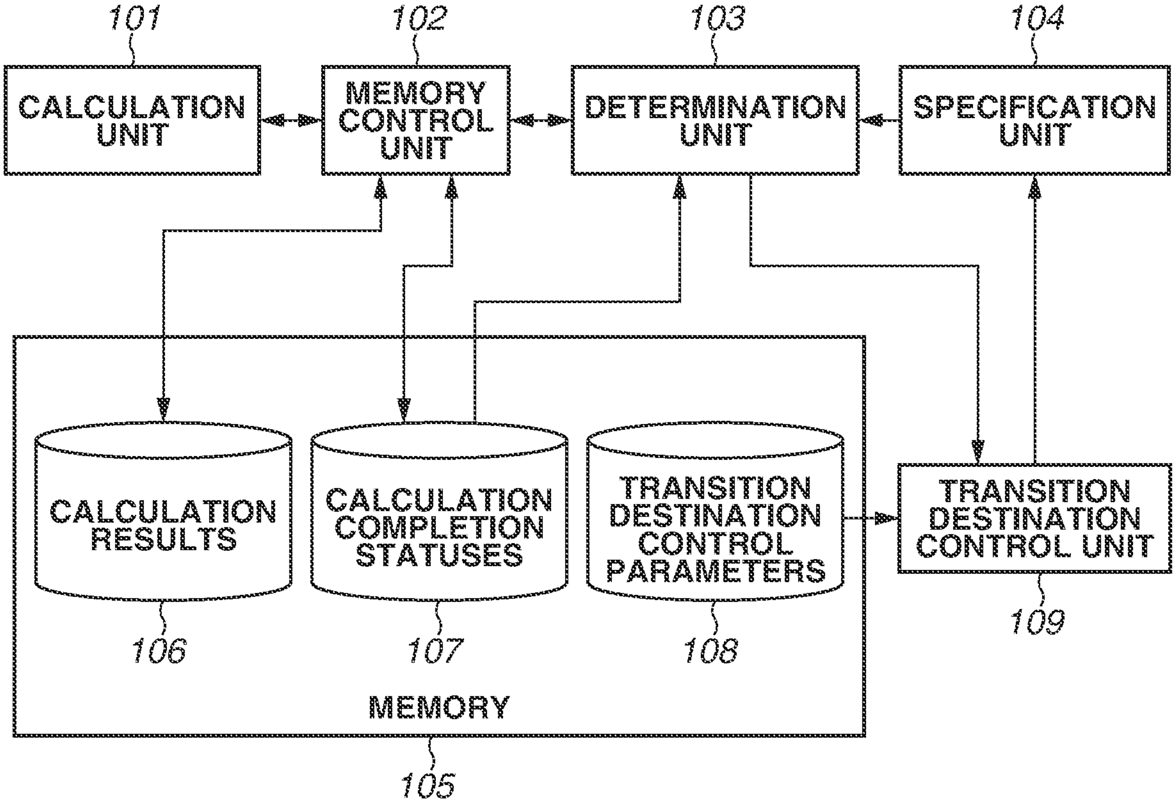
FIG. 1 is a diagram illustrating a configuration example of a feature data processing unit according to first and second exemplary embodiments.

FIG. 1 illustrates a configuration example of the feature data processing unit 807 for implementing the layer order control of the neural network illustrated in FIGS. 7A to 7C. A calculation unit 101 includes a calculation circuit for performing convolution calculation in each layer and feature data expansion processing in the DeConv layer. A memory control unit 102 manages the feature data throughout the processing of the entire network. Specifically, the memory control unit 102 holds calculation results 106 into the ring buffers, stores calculation completion statuses 107, and updates the calculation results 106 and the calculation completion statuses 107 as appropriate. The calculation results 106 are feature data, i.e., the processing results of the layers. The calculation completion statuses 107 are processing statuses indicating up to which line the processing of each layer is completed. A determination unit 103 includes a logic circuit for receiving the calculation results 106 and determining whether the next line of the current layer can be calculated. A specification unit 104 includes a counter for storing which layer is currently under processing and a logic circuit for counting up each time a line of processing ends. A transition destination control unit 109 determines the next layer to be processed based on the result of the determination made by the determination unit 103, and issues an instruction to switch layers by overwriting the count value of the specification unit 104 as appropriate. A memory 105 is a holding unit for holding the calculation results 106, the calculation completion statuses 107, and transition destination control parameters 108. For example, the memory 105 may be constituted by a RAM different from the RAM 809 or a register group. Such memories may be used in combination.

The calculation results 106 refer collectively to the feature data in the first, second, and third layers 401, 403, and 404 in FIG. 7. The feature data in the first and second layers 401 and 403 is held in the ring buffers under management of the memory control unit 102. The calculation completion statuses 107 are held in the memory 105 in the form of the numbers of the next lines to be processed in the respective layers, for example. The calculation completion statuses 107 are managed by the memory control unit 102.

The transition destination control parameters 108 correspond collectively to the parameters 601, 602, and 603 for the first, second, and third layers 401, 403, and 404 in FIG. 6. The operation procedure illustrated in FIGS. 7A to 7C is uniquely determined by the network configuration and the transition destination control parameters 108. The transition destination control parameters 108 may therefore be calculated in advance based on the network configuration, and held in the memory 105.

Figure 9:
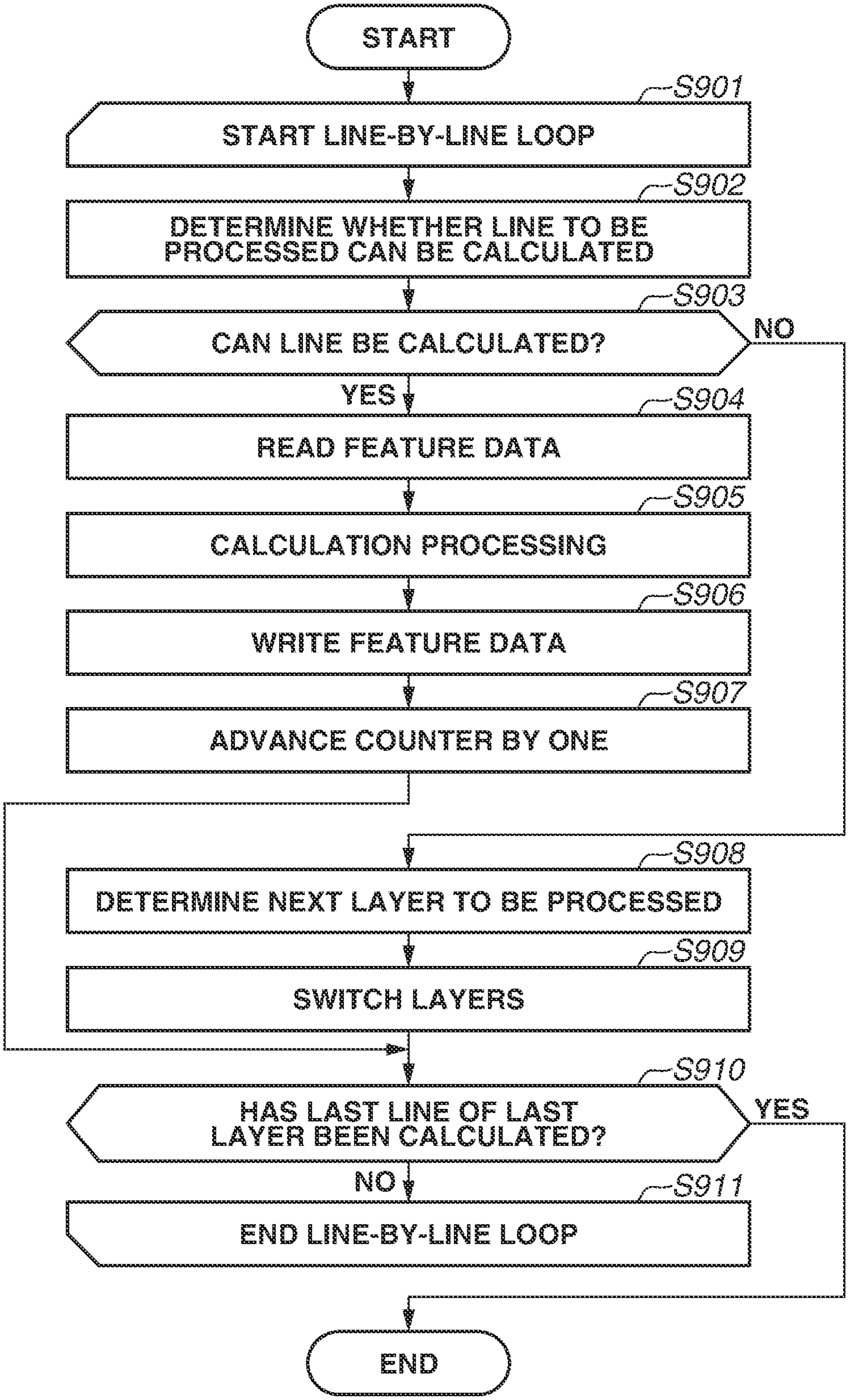
FIG. 9 is a flowchart illustrating a processing procedure by the feature data processing unit according to the first exemplary embodiment.

FIG. 9 is a flowchart illustrating a procedure where the feature data processing unit 807 configured as illustrated in FIG. 1 performs the processing illustrated in FIG. 6. In the series of processes, line-by-line loops are repeated to eventually calculate all the lines of all the layers. The sequence illustrated in FIG. 9 may be performed by components outside the feature data processing unit 807, such as the CPU 806 of FIG. 8, or the components inside the feature data processing unit 807, such as the memory control unit 102 of FIG. 1. In the following description, the sequence is described to be performed by the components inside the feature data processing unit 807.

In step S901, a line-by-line loop is started. The memory control unit 102 instructs the determination unit 103 to start processing. The processing proceeds to step S902. In an initial state, the counter of the specification unit 104 refers to the layer closest to the input, i.e., the first layer 401. All the calculation completion statuses 107 refer to the first lines of the respective layers. If step S901 is performed for the first time, the processing starts at the first line 701 of the first layer 401.

In step S902, the determination unit 103 determines whether the line to be processed can be calculated. The determination unit 103 makes the determination using the calculation completion statuses 107. For example, the first line 709 of the third layer 404 can be calculated if the previous and subsequent lines of the second layer 403 have been calculated. The determination unit 103 thus refers to the calculation completion statuses 107 held in the memory 105, and if the second line 708 of the second layer 403 is found to have been calculated, determines that the first line 709 of the third layer 404 can be calculated.

In step S903, the processing branches based on the result of the determination made by the determination unit 103. If the line can be calculated (YES in step S903), the determination unit 103 notifies the memory control unit 102 of the determination result and the processing proceeds to step S904. If the line is unable to be calculated (NO in step S903), the determination unit 103 notifies the transition destination control unit 109 of the determination result and the processing proceeds to step S908.

In step S904, to perform convolution and other calculation processing, the memory control unit 102 reads intended featured data from the calculation results 106 and inputs the read feature data to the calculation unit 101. For example, in calculating the first line 709 of the third layer 404, the memory control unit 102 reads the first and second lines 704 and 708 of the second layer 403 from the memory 105.

In step S905, the calculation unit 101 receives the input feature data from the memory control unit 102 and performs calculation processing, such as the convolution calculation and the expansion processing in the DeConv layer. Output feature data obtained as a result of the calculation is passed to the memory control unit 102.

In step S906, the memory control unit 102 receives the output feature data from the calculation unit 101, and reflects the output feature data on the calculation results 106. More specifically, the memory control unit 102 holds a line of feature data calculated by the calculation unit 101 into the ring buffer of the corresponding layer held in the memory 105. Here, if the ring buffer has space available, the memory control unit 102 writes the line as a new line. If the ring buffer is full, the memory control unit 102 overwrites the oldest line with the line.

In step S907, the specification unit 104 advances the counter by one to switch the processing target to the subsequent layer. In such a manner, the feature data processing unit 807 processes the layers one line at a time until the processing reaches a layer where the line is unable to be calculated. The branch in the case where the line is determined to be calculable in step S903 ends here. The processing proceeds to step S910.

In step S908, since the line is determined to be incalculable and the processing is unable to proceed to the next layer, the transition destination control unit 109 determines the next layer to be processed based on the transition destination control parameters 108. For example, in the first cycle of FIG. 7A, the first line 709 of the third layer 404 is determined to be incalculable. In such a case, the transition destination control unit 109 determines to transition to the second layer 403 based on the parameter 603 for the third layer 404. The result of the transition destination control is passed to the specification unit 104.

In step S909, the specification unit 104 receives the result from the transition destination control unit 109 and switches the layers. More specifically, the specification unit 104 overwrites the value of the counter indicating the layer under processing with the value of the transition destination control parameter 108. In such a manner, if the feature data processing unit 807 fails in calculating the line, the feature data processing unit 807 returns to the layer specified by the transition destination control parameter 108 and resumes processing. The branch in the case where the line is determined to be incalculable in step S903 ends here. The processing proceeds to step S910.

In step S910, the memory control unit 102 refers to the calculation completion statuses 107 and checks whether the last line of the last layer has been calculated. If the last line has been calculated (YES in step S910), the processing of the entire network ends here. If the last line has not been calculated (NO in step S910), the processing proceeds to step S911 to continue processing the rest of the lines.

In step S911, the line-by-line loop ends. The memory control unit 102 proceeds to step S901 to start the processing of the next loop. Steps S901 to S911 are repeated while switching the layers, whereby all the lines of all the layers are eventually calculated.

In light of the foregoing, the layer order control to return to a given layer and continue processing can be performed by giving appropriate transition destination control parameters 108 to the transition destination control unit 109. This enables control to calculate two lines of the second layer 403 and two lines of the third layer 404 while calculating a line of the first layer 401. Networks, such as illustrated in FIG. 3, can thus be processed with reduced memory usage.

Next, a second exemplary embodiment will be described in detail with reference to the attached drawings. In the present exemplary embodiment, a detailed description of similar parts to those of the first exemplary embodiment will be omitted. Such parts are denoted by the same reference numerals as in the first exemplary embodiment.

In the second exemplary embodiment, the processing order of layers in a network different from that of the first exemplary embodiment is controlled using parameters assigned to the respective layers and a result of determination as to whether input layer-side feature data is sufficient. The apparatus and method described below are directed to providing a unit for processing a neural network with reduced memory usage even if the network configuration changes.

The second exemplary embodiment deals with a network including merging. Since the connection is not necessarily serial, each layer in the second exemplary embodiment will be referred to as a processing node (hereinafter, simply "node"). If a plurality of nodes is merged into a node, the intended lines of feature data in all the nodes to be merged are calculated before calculation of a line of feature data in the merged node.

The second exemplary embodiment deals with a case where the storing size and discarding size of feature data in the network including merging do not match between nodes. A network including merging can include a plurality of external inputs, i.e., sections corresponding to input layers. The external inputs can be different in the size of data input per cycle of processing. In such a case, the storing size and discarding size of feature data can fail to match between nodes.

An example of a network configuration that includes merging and where the storing size and discarding size of feature data do not match between nodes will initially be described. A data processing apparatus and method according to the present exemplary embodiment will then be described with focus on differences from the first exemplary embodiment, using the case of processing the foregoing network configuration.

The apparatus and method described below are directed to processing a neural network while maintaining the numbers of lines of feature data held in the ring buffers of all the layers constant to reduce memory usage.

<Processing of Neural Network Using Ring Buffers>

Figure 10:
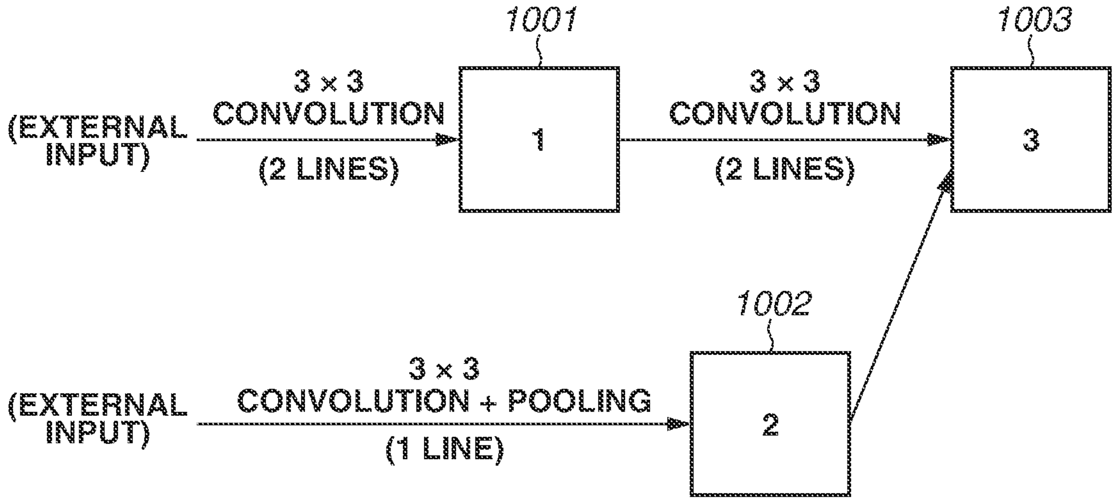
FIG. 10 is a diagram illustrating an example of a three-layer network including merging.

FIG. 10 illustrates an example of a network that includes merging and where the storing size and discarding size of feature data do not match between nodes. This network includes three layers, namely, a first node 1001, a second node 1002, and a third node 1003. Each node is a convolution layer with a kernel size of 3. The third node 1003 is the final output of the network of FIG. 10. The purpose of the processing is to calculate all the lines of these nodes. The first node 1001 and the second node 1002 are intermediate outputs of the network of FIG. 10, and the feature data is held in ring buffers.

The second node 1002 includes pooling processing in addition to convolution processing. In the pooling processing, feature data obtained by convolution is downsampled for output. The size of the feature data output in a single cycle of processing is thus smaller than that of a normal convolution layer. In the network of FIG. 10, the first and third layers 1001 and 1003 that are normal convolution layers calculate two lines at a time in a single cycle of processing. By contrast, the second layer 1002 that is a convolution layer including pooling calculates a line in a single cycle of processing.

Figure 11A:
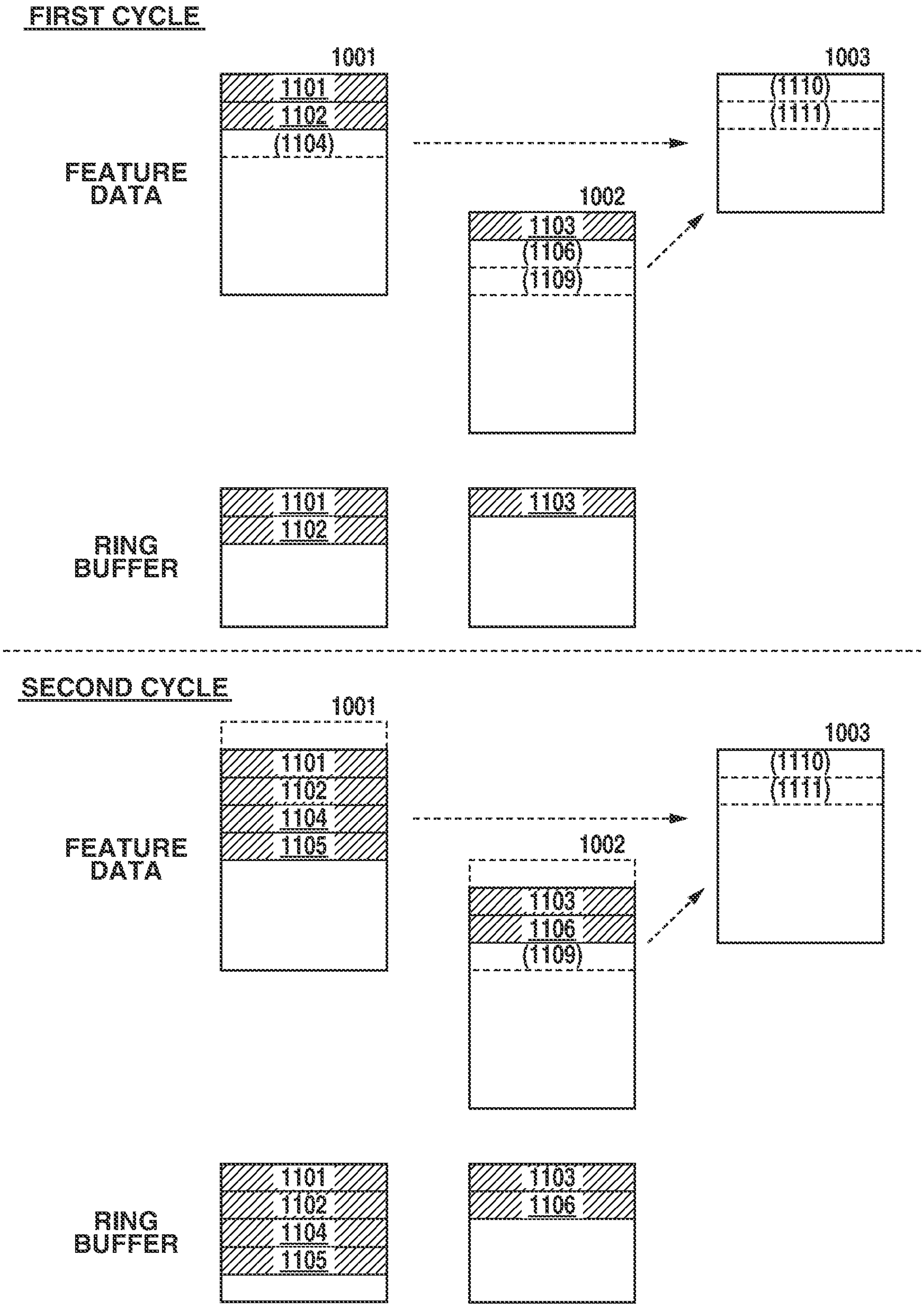
FIGS. 11A and 11*b* are diagrams illustrating a procedure for processing the network of FIG. 10.
Figure 11B:
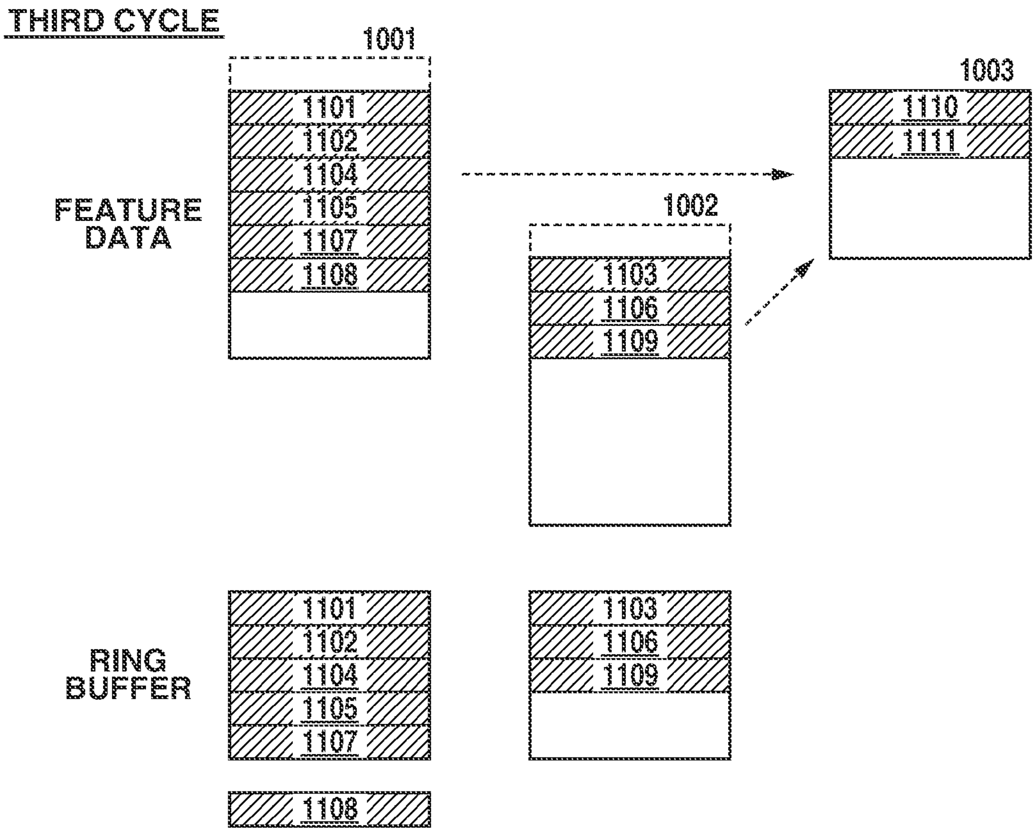

FIGS. 11A and 11B illustrate a procedure in a case where the nodes of the network of FIG. 10 are cyclically processed. In the first cycle, a first line 1101 and a second line 1102 of the first node 1001 are initially calculated as processing of the first node 1001. Next, a first line 1103 of the second node 1002 is calculated as processing of the second node 1002. A first line 1110 and a second line 1111 of the third node 1003 are then attempted to be calculated as processing of the third node 1003. However, the first and second lines 1110 and 1111 of the third node 1003 are unable to be calculated since a third line 1104 of the first node 1001 and second and third lines 1106 and 1109 of the second node 1002 have not been calculated at this point in time. The processing thus returns to the first node 1001 and proceeds to the second cycle.

In the second cycle, a third line 1004 and a fourth line 1005 of the first node 1001 are initially calculated. Next, the second line 1106 of the second node 1002 is calculated. The processing of the third node 1003 is then attempted. However, the first and second lines 1110 and 1111 of the third node 1003 are unable to be calculated since the third line 1109 of the second node 1002 has not been calculated at this point in time. The processing thus returns to the first node 1001 and proceeds to the third cycle.

In the third cycle, a fifth line 1107 and a sixth line 1108 of the first node 1001 are initially calculated. Next, the third line 1109 of the second node 1002 is calculated. The first and second lines 1110 and 1111 of the third node 1003 are then calculated as processing of the third node 1003. At the beginning of the third cycle, the first line 1101 of the first node 1001 is held in the ring buffer since the first line 1101 is used to calculate the first line 1110 of the third node 1003. The five-line capacity is thus insufficient to hold the sixth line 1108 of the first node 1001 in the ring buffer.

In the case of FIG. 11B, the line buffer of the first node 1001 accumulates more lines than that of the second node 1002. The reason is that the numbers of lines calculated in the first node 1001 and the second node 1002 in each cycle are different. Specifically, since the second node 1002 is calculated one layer in each cycle, the speed of calculation of the third node 1003 is limited to two lines at every two cycles. This results in a mismatch with the first node 1001 where two lines are calculated in each cycle. As with the first layer 401 of FIGS. 5A and 5B, continuing such processing will eventually entail the capacity of the line buffer of the first node 1001 up to approximately one half the total number of lines. This increases the memory usage.

As described above, the method for cyclically processing the layers is unable to achieve the original purpose of reducing the memory usage if the storing size and discarding size of feature data into/from the ring buffers do not match between nodes. To solve such an issue, the data processing apparatus and method described below perform control of repetition of processing of some nodes a plurality of times to match the output data sizes between the nodes.

<Control of Layer Processing Order>

Figure 12:
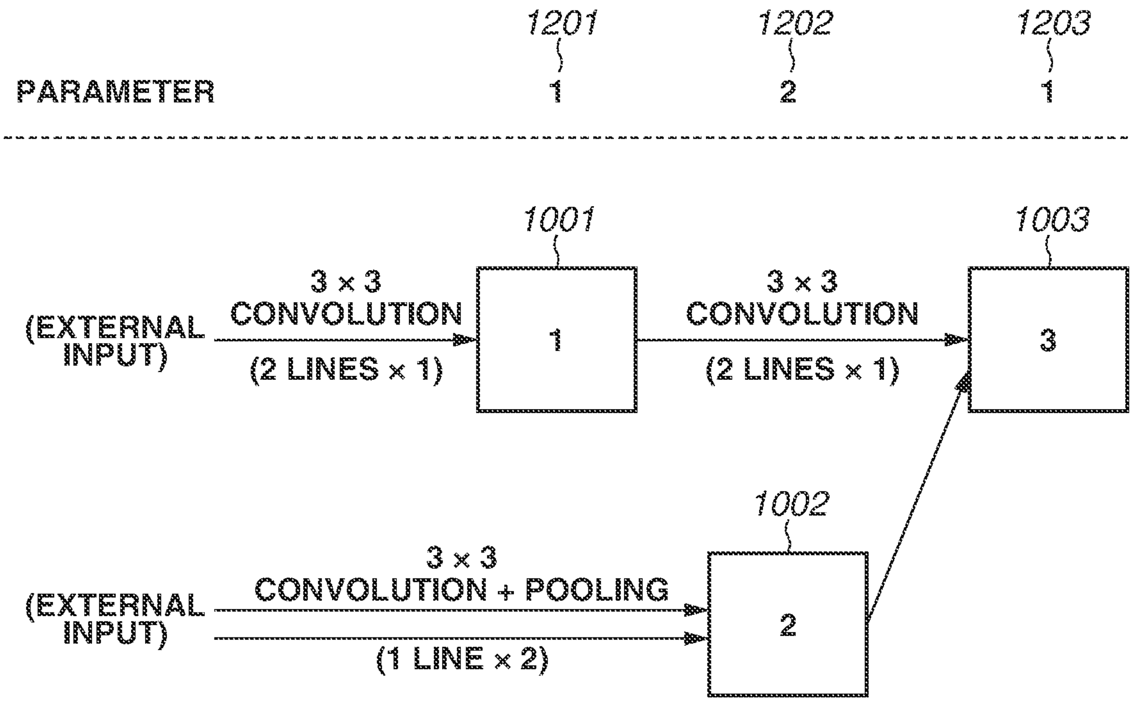
FIG. 12 is a diagram illustrating parameter assignment and layer order control according to the second exemplary embodiment.

FIG. 12 illustrates an example of parameter assignment to the nodes and the resulting control of the layer processing order of the nodes in processing the network of FIG. 10 by the data processing apparatus and method according to the present exemplary embodiment. In the second exemplary embodiment, the maximum number of times each node can be calculated repeatedly if the input-side feature data in the node is determined to be sufficient is assigned as a parameter. For example, if a line of the second node 1002 of FIG. 12 is determined to be calculable, up to two lines are continuously calculated based on a parameter 1202 for the second node 1002. By contrast, the first node 1001 and the third node 1003 are not processed repeatedly since a parameter 1201 for the first node 1001 and a parameter 1203 for the third node 1003 are set to 1.

The foregoing parameter settings can make the number of times of processing of the second node 1002 greater than that of the first node 1001. The number of lines held in the ring buffer of the first node 1001 can thereby be prevented from exceeding that of the second node 1002.

More specifically, the layer order control is performed so that while two lines of feature data are calculated in the first node 1001, two lines, the number of lines being the same, are also calculated in the other branch, i.e., the second node 1002.

Figure 13A:
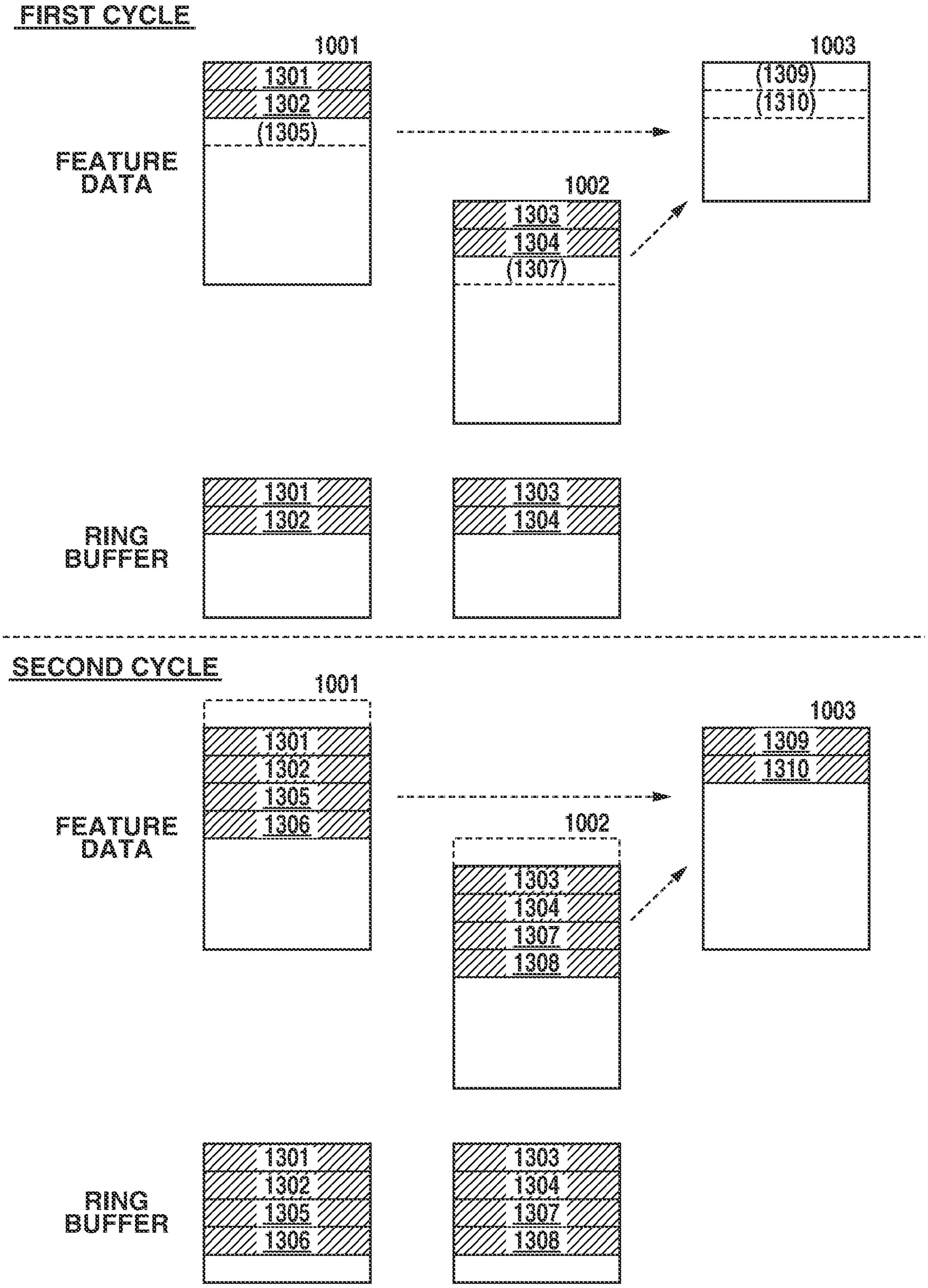
FIGS. 13A and 13B are diagrams illustrating a procedure for processing the network of FIG. 10 according to the second exemplary embodiment.
Figure 13B:
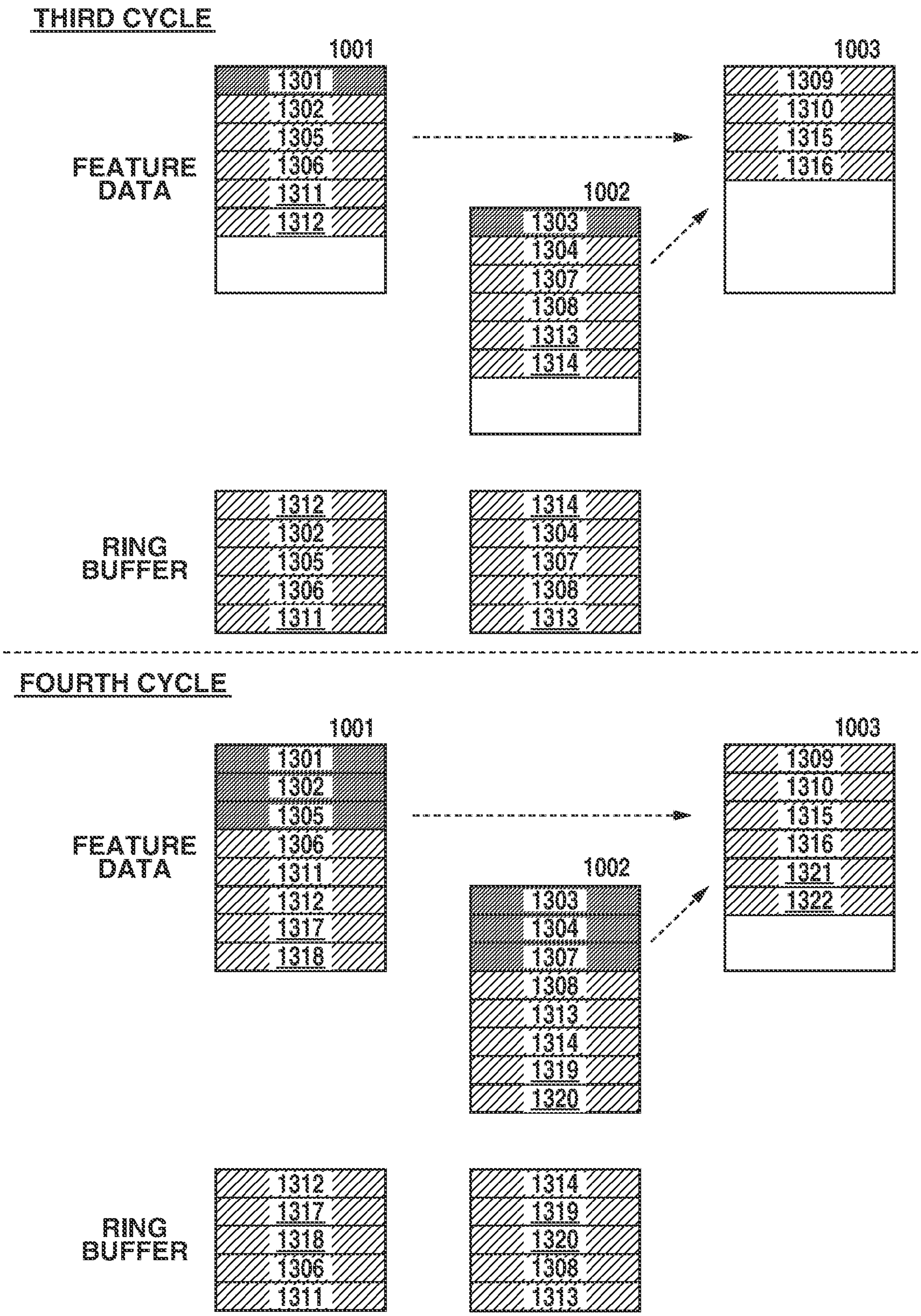

FIGS. 13A and 13B illustrate a procedure in the case where the network of FIG. 10 is processed by the control of FIG. 12 according to the second exemplary embodiment. In the first cycle, the first node 1001 is initially processed. Two lines are calculated only once based on the parameter 1201 for the first node 1001. Two lines, namely, a first line 1301 and a second line 1302 of the first node 1001 are thus calculated. Next, the second node 1002 is processed. Calculation of a line is performed up to twice based on the parameter 1202 for the second node 1002. Two lines, namely, a first line 1303 and a second line 1304 of the second node 1002 are thus calculated. Next, the third node 1003 is processed. Two lines are attempted to be calculated once based on the parameter 1203 for the third node 1003. Since a third line 1305 of the first node 1001 and a third line 1307 of the second node 1002 have not been calculated at this point in time, a second line 1310 of the third node 1003 is unable to be calculated. The processing therefore returns to the first node 1001 and the first cycle ends without calculating a line of the third node 1003.

In the second cycle, the third line 1305 and a fourth line 1306 of the first node 1001 are initially calculated. Next, the third line 1307 and a fourth line 1308 of the second node 1002 are calculated. Next, the third node 1003 is processed. Up to the second line 1310 of the third node 1003 can be calculated since both up to the third line 1305 of the first node 1001 and up to the third line 1307 of the second node 1002 have been calculated at this point in time. Two lines, namely, a first line 1309 and a second line 1310 of the third node 1003 are thus calculated. The processing returns to the node 1001 and the second cycle ends.

In the third cycle, a fifth line 1311 and a sixth line 1312 of the first node 1001 are initially calculated. Next, a fifth line 1313 and a sixth line 1314 of the second line 1002 are calculated. A third line 1315 and a fourth line 1316 of the third node 1003 are then calculated. Since the calculation up to the second line 1310 of the third node 1003 has been completed at the beginning of the third cycle, the first line 1301 of the first node 1001 and the first line 1303 of the second node 1002 will not be used for subsequent calculations. The first line 1301 of the first node 1001 and the first line 1303 of the second node 1002 are therefore overwritten with the sixth line 1312 of the first node 1001 and the sixth line 1314 of the second node 1002, respectively.

In the fourth cycle, a seventh line 1317 and an eighth line 1318 of the first node 1001 are initially calculated. Next, a seventh line 1319 and an eighth line 1320 of the second node 1002 are calculated. A fifth line 1321 and a sixth line 1322 of the third node 1003 are then calculated. Since the calculation up to the fourth line 1316 of the third node 1003 has been completed at the beginning of the fourth cycle, the second and third lines 1302 and 1305 of the first node 1001 and the second and third lines 1304 and 1307 of the second node 1002 will not be used for subsequent calculations. The second and third lines 1302 and 1305 of the first node 1001 are therefore overwritten with the seventh and eighth lines 1317 and 1318 of the first node 1001, respectively. The second and third lines 1304 and 1307 of the second node 1002 are overwritten with the seventh and eighth lines 1319 and 1320 of the second node 1002, respectively.

Subsequently, the first node 1001, the second node 1002, and the third node 1003 are calculated in two lines each at every cycle repeatedly. While two lines of the first node 1001 are calculated, two lines of the second node 1002 are also calculated. Since two lines of the third node 1003 are calculated as well, the first and second nodes 1001 and 1002 are both disused in two lines.

As described above, the method illustrated in FIGS. 13A and 13B can process the network of FIG. 10 without overflowing the ring buffers of all the intermediate nodes, i.e., the first and second nodes 1001 and 1002. This enables processing with reduced memory usage.

<Configuration of Data Processing Apparatus According to Second Exemplary Embodiment>

The data processing apparatus according to the second exemplary embodiment has a similar configuration to that illustrated in FIGS. 8 and 1. A difference from the first exemplary embodiment is that the calculation unit 101 according to the second exemplary embodiment performs calculation processing for pooling. In the case of a convolution layer without pooling, the calculation unit 101 calculates two lines of feature data. In the case of a convolution layer including pooling, the calculation unit 101 performs downsampling and passes a line of output data to the memory control unit 102, as well as similarly calculates two lines of feature data.

In the second exemplary embodiment, the transition destination control unit 109 includes a counter (number of repetitions counter) for holding the number of times the same node is processed repeatedly. The transition destination control unit 109 determines the next node to be processed by comparing the value of its counter with the transition destination control parameters 108.

Figure 14:
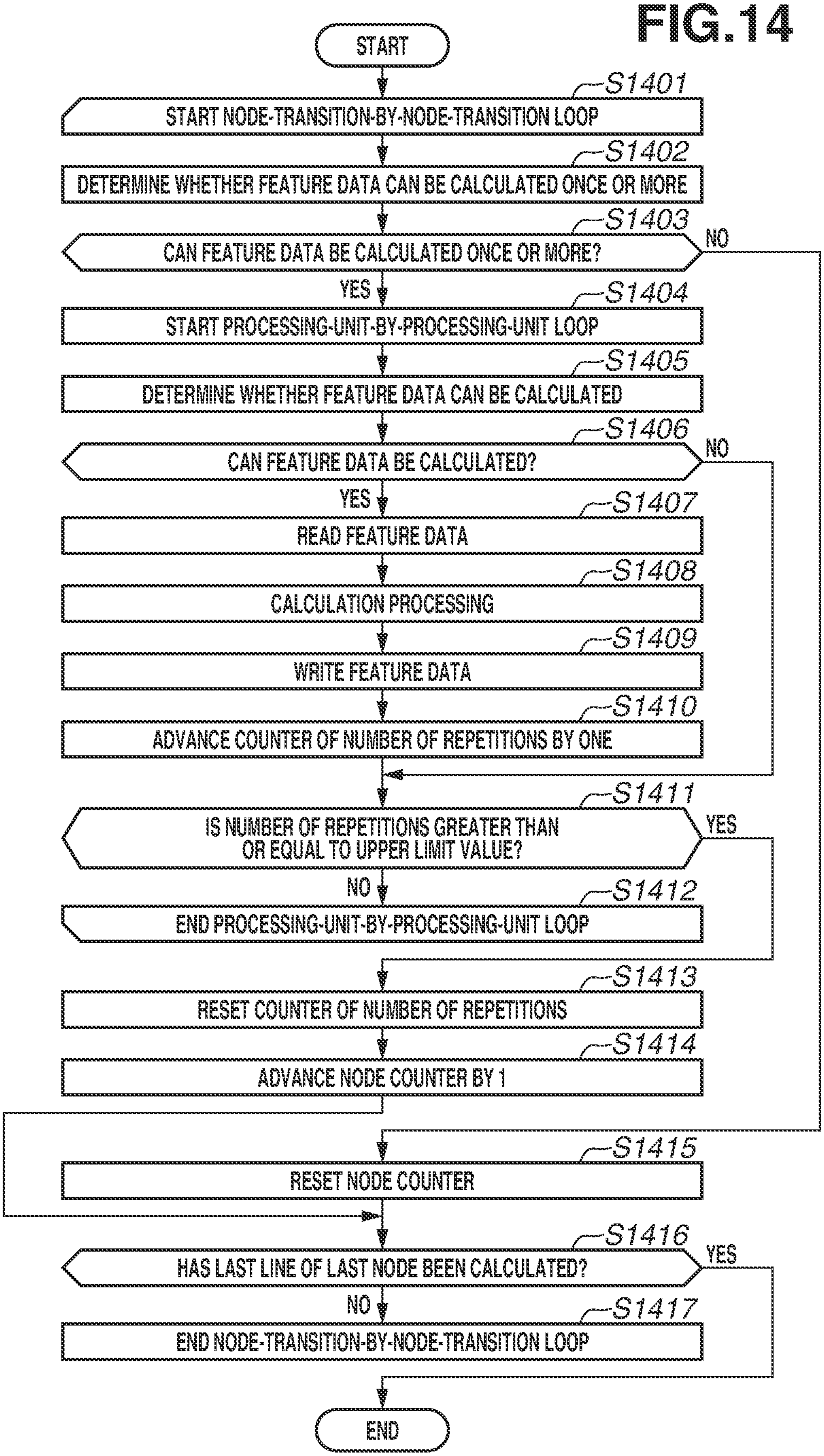
FIG. 14 is a flowchart illustrating a processing procedure by the feature data processing unit according to the second exemplary embodiment.

FIG. 14 illustrates a flowchart for the feature data processing unit 807 configured as illustrated in FIG. 1 to perform the processing illustrated in FIGS. 13A and 13B. In the series of processes, line-by-line loops are repeated to eventually calculate all the lines of all the nodes.

In step S1401, the feature data processing unit 807 starts a node-transition-by-node-transition loop. This loop corresponds to the line-by-line loop in FIG. 9. In the first exemplary embodiment, a line is processed between a transition to a node and a transition to the next node. In the second exemplary embodiment, the number of lines to be processed is variable because of the difference in the units of processing by the calculation unit 101 and the repetition processing. In the second exemplary embodiment, a unit of processing for a single loop starting at step S1401 will be referred to as a node-transition-by-node-transition unit of processing. In an initial state, the counter of the specification unit 104 refers to the first node 1001. If step S1401 is performed for the first time, the feature data processing unit 807 thus starts processing at the first line 1301 of the first node 1001.

In step S1402, the determination unit 103 determines whether the calculation unit 101 can calculate feature data in the node indicated by the counter of the specification unit 104 once or more. For example, at the third node 1003 in the first cycle of FIG. 13A, the calculation unit 101 attempts to calculate the first and second, two lines 1309 and 1310 of the third node 1003. Here, the calculation unit 101 is unable to calculate the feature data in the third node 1003 at all since neither the third line 1305 of the first node 1001 or the third line 1307 of the second node 1002 to be used in calculating the second line 1310 of the third node 1003 has not been calculated. At the third node 1003 without pooling processing, the calculation unit 101 calculates feature data in two lines. The calculation unit 101 therefore does not perform the processing if the first line 1309 alone of the third node 1003 can be calculated.

In step S1403, the processing branches based on the result of the determination made by the determination unit 103 in step S1402. If the feature data can be calculated for one or more lines (YES in step S1403), the processing proceeds to step S1404. If the feature data is unable to be calculated for any lines (NO in step S1403), the determination unit 103 notifies the specification unit 104 of the determination result and the processing proceeds to step S1415.

In step S1404, the calculation unit 101 starts a processing-unit-by-processing-unit loop. In the second exemplary embodiment, the calculation unit 101 repeats the processing a plurality of times based on the transition destination control parameters 108. In a single loop of processing starting at step S1404, the calculation unit 101 processes the feature data once. The feature data to be processed by a single cycle of processing by the calculation unit 101 is two lines in the case of the first and third nodes 1001 and 1003 that are convolution layers without pooling processing, and a line in the case of the second node 1002 including the pooling processing.

In step S1405, like step S1402, the determination unit 103 determines whether the calculation unit 101 can calculate feature data. The loop starting at step S1404 is performed only if the determination unit 103 determines that the calculation unit 101 can calculate feature data once or more. Step S1405 is performed in each loop starting at step S1404. In other words, there is a difference in that step S1402 is intended to determine whether the calculation unit 101 can calculate feature data once or more and step S1405 is intended to determine whether the calculation unit 101 can calculate the next line of feature data. For example, suppose that the counter of the specification unit 104 refers to the second node 1002 in the first cycle of FIG. 13A. If the loop starting at step S1404 is performed for the first time, the determination unit 103 determines in step S1405 whether the first line 1303 of the second node 1002 can be calculated. If the loop starting at step S1404 is performed for the second time, the determination unit 103 determines in step S1405 whether the second line 1304 of the second node 1002 can be calculated.

In step S1406, the processing branches based on the result of the determination made by the determination unit 103 in step S1405. If the calculation unit 101 can calculate the feature data (YES in step S1406), the determination unit 103 notifies the memory control unit 102 of the determination result to continue the processing of the current node and the processing proceeds to step S1407. If the calculation unit 101 is unable to calculate the feature data (NO in step S1406), the processing proceeds to step S1411 to end the processing of the current node and proceed to the next node. Further, step S1406 is not reachable unless the calculation unit 101 is determined to be able to calculate the feature data once or more in step S1403. The determination that the calculation unit 101 is unable to calculate the feature data in this step S1406 therefore guarantees that the calculation by the calculation unit 101 has been performed at least once or more.

In step S1407, like step S904 of FIG. 9, the memory control unit 102 reads intended feature data from the calculation results 106, and supplies the read feature data to the calculation unit 101. Take, for example, the case of calculating the first and second lines 1309 and 1310 of the third node 1003. In such a case, the memory control unit 102 obtains a total of six lines including the first, second, and third lines 1301, 1302, and 1305 of the first node 1001 and the first, second, and third lines 1303, 1304, and 1307 of the second node 1002 from the calculation results 106 held in the memory 105.

In step S1408, like step S905 of FIG. 9, the calculation unit 101 performs convolution calculation and pooling processing. The output feature data obtained as a result of the calculation is passed to the memory control unit 102.

In step S1409, like step S906 of FIG. 9, the memory control unit 102 receives the output feature data from the calculation unit 101, and reflects the output feature data on the calculation results 106 held in the memory 105. More specifically, the one or two lines of feature data calculated by the calculation unit 101 is held into the ring buffer of the corresponding node in the memory 105. Here, if the ring buffer has space available, the memory control unit 102 writes the line(s) as a new line or lines. If the ring buffer is full, the memory control unit 102 overwrites the oldest line(s) with the new one(s). After the writing is completed, the memory control unit 102 notifies the transition destination control unit 109 of the completion of the processing via the determination unit 103. The processing proceeds to step S1410.

In step S1410, the transition destination control unit 109 advances its number of repetitions counter by one since the processing of the calculation unit 101 is completed for a single round. In the initial state, the counter has a value of 0.

In step S1411, the transition destination control unit 109 compares the value of its number of repetitions counter with the upper limit value of the number of repetitions indicated by the corresponding transition destination control parameter 108. For example, if the counter of the specification unit 104 refers to the second node 1002, the upper limit value of the number of repetitions is the value indicated by the parameter 1202 for the second node 1002, i.e., 2. If the number of repetitions is less than the upper limit value (NO in step S1411), the processing proceeds to step S1412 to repeat the processing of the current node. If the number of repetitions is greater than or equal to the upper limit value (YES in step S1411), the processing proceeds to step S1413 to end the processing of the current node.

In step S1412, the calculation unit 101 ends the processing-unit-by-processing-unit loop. To continue the processing of the current node, the processing returns to step S1404. By repeating the processing of steps S1404 to S1412, the processing of the calculation unit 101 can be repeated as many times as possible within the upper limits specified by the transition destination control parameters 108.

In step S1413, in ending the processing of the current node, the transition destination control unit 109 resets the value of its counter. In other words, the value of the counter of the transition destination control unit 109 at the timing when a loop is started at step S1404 next time is always 0.

In step S1414, the specification unit 104 advances its counter by 1, whereby the processing target is switched to the subsequent node. If the counter is advanced by 1 at the final stage, e.g., the third node 1003, the counter cyclically returns to the first node 1001. The branch in the case where the calculation unit 101 is determined to be able to calculate feature data once or more in step S1403 ends here. The processing proceeds to step S1416.

In step S1415, the specification unit 104 resets the counter to switch the processing target to the node at the foremost stage, e.g., the first node 1001 since the processing of the calculation unit 101 is not performed at all in the current node. The branch in the case where the calculation unit 101 is determined to be unable to calculate the feature data in step S1403 ends here. The processing proceeds to step S1416.

In step S1416, the memory control unit 102 refers to the calculation completion statuses 107 and checks whether the last line of the last node has been calculated. If the last line has been calculated (YES in step S1416), the processing of the entire network, i.e., the processing of the flowchart of FIG. 14 ends. If not (NO in step S1416), the processing proceeds to step S1417 to continue processing the rest of the lines.

In step S1417, the node-transition-by-node-transition loop ends. The memory control unit 102 proceeds to step S1401 to start the processing of the next loop. Steps S1401 to S1417 are repeated while switching the nodes, whereby all the lines of all the nodes are eventually calculated.

In the light of the foregoing, the layer order control to process the second node 1002 where the number of lines to be calculated at a time is small a plurality of times repeatedly can be implemented by giving appropriate transition destination control parameters 108 to the transition destination control unit 109. This enables control to calculate two lines of the second node 1002 as well while calculating two lines of the first node 1001, the number of lines being equal to each other, whereby the network illustrated in FIG. 10 can be processed with reduced memory usage.

Other Exemplary Embodiments

In the first exemplary embodiment, the data processing apparatus illustrated in FIG. 1 processes the three-layer convolutional neural network illustrated in FIG. 4. In the second exemplary embodiment, the three-node convolutional neural network illustrated in FIG. 10 is processed.

However, a data processing apparatus according to an exemplary embodiment of the present disclosure can perform calculation processing other than that of a convolutional neural network as long as the calculation processing is spatial filter processing like convolution processing and includes hierarchical processing like that of a neural network.

<Units of Calculation and Memory Read and Write>

In the first and second exemplary embodiments, the calculation unit 101 of the data processing apparatus illustrated in FIG. 1 calculates feature data in units of lines. The memory control unit 102 configures line-by-line ring buffers in the memory 105, and reads and writes feature data.

However, the processing of the calculation unit 101 and the memory control unit 102 may be performed in units of processing other than lines if the feature data is divided in steps of a certain size. For example, the processing may be performed in units of blocks into which the two-dimensional feature data is subdivided, instead of in units of lines, i.e., one-dimensional data into which the two-dimensional feature data is divided.

<Combined Use of Transition Destination Control and Repetition Control>

In the first exemplary embodiment, if feature data is unable to be calculated, the processing transitions to a layer specified by the corresponding transition destination control parameter 108 based on the flowchart illustrated in FIG. 9. In the second exemplary embodiment, if feature data can be calculated, the processing of the current node is repeated up to the number of times specified by the corresponding transition destination control parameter 108 based on the flowchart illustrated in FIG. 14.

Such two types of layer order control may be used in combination. In such a case, the transition destination control parameters 108 include two types of parameters, namely, ones indicating the transition destination layers like the parameters 601 to 603 in FIG. 6 and ones indicating the numbers of repetitions like the parameters 1201 to 1203 in FIG. 12. In step S1414 of the flowchart illustrated in FIG. 14, the feature data processing unit 807 performs transition destination determination processing corresponding to steps S908 and S909 of the flowchart illustrated in FIG. 9.

<Setting of Ring Buffer Sizes Using Parameters>

In the first exemplary embodiment, the network illustrated in FIG. 4 is processed layer by layer with a ring buffer size of three lines by the layer order control illustrated in FIG. 7. In the second exemplary embodiment, the network illustrated in FIG. 10 is processed node by node with a ring buffer size of five lines by the layer order control illustrated in FIG. 13.

However, the ring buffer sizes of the respective nodes may be specified using the transition destination control parameters 108. Once the network configuration and the transition destination control parameters 108 are determined, the minimum ring buffer sizes of the respective layers for network processing can be determined since the layer order control is uniquely determined. The memory usage can thus be further reduced by reserving the storage areas in use for the processing of the feature data.

In such a case, the memory control unit 102 refers to the transition destination control parameters 108 in the memory 105, and reserves the storage areas for the ring buffers of the respective nodes. Like other information as the transition destination control parameters 108, the sizes of the ring buffers of the respective nodes are calculated in advance and held in the memory 105.

<Node-by-Node Switching of Ring Buffer Use>

In the first exemplary embodiment, the feature data in the first and second layers 401 and 403, or intermediate layers, is held in the ring buffers. In the second exemplary embodiment, the feature data in the first and second nodes 1001 and 1002, or intermediate nodes, is held in the ring buffers.

However, all the lines of feature data in an intermediate node specified by the transition destination control parameters 108 may be held in the memory 105. Selecting whether to hold all the lines in the memory 105 or hold some lines in a ring buffer node by node enables handling of situations where feature data in a specific intermediate node is output to outside with reduced memory usage.

In such a case, the memory control unit 102 refers to the transition destination control parameters 108 in the memory 105, and performs storage control to switch whether to hold all the lines in the memory 105 or hold some lines in a ring buffer node by node. How to hold feature data is determined node by node in advance, and the information is used to calculate other information as the transition destination control parameters 108.

<Determination Based on Output Node-Side Ring Buffer Capacity>

In the first and second exemplary embodiments, the determination unit 103 refers to the calculation completion statuses 107 in the memory 105 and determines whether feature data can be calculated based on whether the input node-side feature data has been calculated.

However, the determination unit 103 may refer to the calculation results 106 in the memory 105 and determine whether feature data can be calculated based on whether the output node-side ring buffer has space available. If the line buffers are small in size, processing may be unable to be performed because the output node-side line buffer is full, despite the fact that the input node-side feature data has been calculated. To address such a case, layer order control not to process the current node can be performed so that the subsequent stage is processed first to free the output node-side line buffer.

In such a case, the feature data processing unit 807 determines, in step S902 of the flowchart illustrated in FIG. 9, whether feature data can be calculated based on whether the output node-side ring buffer has space available. In step S903, another branch may be added so that if the calculability condition on the input node side is satisfied and that on the output node side is not, the processing proceeds to step S907, for example.

According to the foregoing exemplary embodiments, sequential processing of data by a plurality of hierarchically connected processing nodes can be efficiently performed.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-072781, filed Apr. 26, 2022, which is hereby incorporated by reference herein in its entirety.

What is claimed is:

1. A data processing apparatus comprising:

one or more memories including a plurality of fixed-size ring buffers respectively corresponding to a plurality of hierarchically connected processing nodes; and one or more circuits configured to:

sequentially perform processing of data by the plurality of hierarchically connected processing nodes;

store, in each of the plurality of fixed-size ring buffers, processing results generated by a corresponding one of the plurality of processing nodes;

store, in the one or more memories, processing statuses of the respective ones of the plurality of processing nodes and parameters for the respective ones of the plurality of processing nodes, wherein the parameters include, for each processing node of the plurality of processing nodes, a transition-destination parameter that indicates a target processing node, among the plurality of processing nodes, to which processing is to transition in a case where data to be used in processing by the processing node is determined, based on the stored processing statuses, to be insufficient, and wherein the transition-destination parameter for each processing node is determined in advance based on a structure of the plurality of hierarchically connected processing nodes so that, for a fixed-size ring buffer corresponding to a processing node, an amount of data additionally stored in the fixed-size ring buffer is prevented from exceeding an amount of data stored in the fixed-size ring buffer that becomes discardable after being used in subsequent processing;

cyclically specify, as a specified processing node, one of the processing nodes, from among the plurality of processing nodes, to perform the processing in an order based on hierarchy;

determine whether data to be used in processing by the specified processing node is sufficient for the processing by the specified processing node based on the stored processing statuses; and determine a processing node to perform the processing based on a result of the determination and the transition-destination parameter for the specified processing node, wherein, in a case where the data to be used in the processing by the specified processing node is determined to be insufficient, determine the target processing node indicated by the transition-destination parameter for the specified processing node as the processing node to perform the processing, the target processing node being closer to an input side of the plurality of hierarchically connected processing nodes than the specified processing node.

2. The data processing apparatus according to claim 1, wherein each of the plurality of fixed-size ring buffers includes a plurality of storage areas configured to hold the processing results generated by the corresponding one of the plurality of processing nodes, a processing result in each of the plurality of storage areas being overwritten with another processing result generated by the corresponding one of the plurality of processing nodes.

3. The data processing apparatus according to claim 1, wherein the one or more circuits are further configured to, in the case where the data to be used in the processing by the specified processing node is determined to be insufficient, switch from the specified processing node to the target processing node by overwriting a counter value used to cyclically specify the processing nodes with a value of the transition-destination parameter for the specified processing node.

4. The data processing apparatus according to claim 1, wherein the transition-destination parameters for each processing node is determined based on the structure of the plurality of hierarchically connected processing nodes, a size of data generated by processing of at least one processing node, and a size of data stored in a fixed-size ring buffer that becomes discardable after being used in subsequent processing.

5. The data processing apparatus according to claim 1, wherein the processing by the plurality of processing nodes includes convolution processing and deconvolution processing.

6. The data processing apparatus according to claim 1, wherein the parameters further include, for each processing node of the plurality of processing nodes, a value indicating a number of times the processing node is to continuously performs the processing, and wherein the one or more circuits are further configured to, in a case where the specified processing node is determined to perform the processing and a number of times the processing has been continuously performed by the specified processing node is less than the number of times indicated by the value, determine the specified processing node as the processing node to perform the processing.

7. The data processing apparatus according to claim 6, wherein the value indicating the number of times for each processing node to continuously perform the processing is set based on a size of a unit of processing of data for the processing node to process.

8. The data processing apparatus according to claim 6, wherein processing by at least one processing node of the plurality of processing nodes includes processing that refers to processing results from two or more other processing nodes.

9. The data processing apparatus according to claim 1, wherein the parameters further include sizes of areas in the one or more memories to hold the processing results of the plurality of respective processing nodes, and wherein the one or more circuits are further configured to set the plurality of fixed-size ring buffers in the one or more memories based on the sizes.

10. The data processing apparatus according to claim 1, wherein the parameters further include a value indicating a processing node for which all processing results are to be stored, and wherein the one or more circuits are further configured to refer to the parameters and control, for each of the plurality of processing nodes, whether to store all processing results generated by the processing node in the one or more memories or to store a part of the processing results generated by the processing node in the fixed-size ring buffer corresponding to the processing node.

11. The data processing apparatus according to claim 1, wherein the one or more circuits are further configured to determine whether to perform the processing by the specified processing node further based on whether the one or more have an area available to store the processing result of the specified processing node.

12. A method for controlling an apparatus having one or more memories including a plurality of fixed-size ring buffers respectively corresponding to a plurality of hierarchically connected processing nodes for sequentially performing processing of data by the plurality of hierarchically connected processing nodes, the method comprising:

storing, in each of the plurality of fixed-size ring buffers, processing results generated by a corresponding one of the plurality of processing nodes;

storing, in the one or more memories, processing statuses of the respective ones of the plurality of processing nodes and parameters for the respective ones of the plurality of processing nodes, wherein the parameters include, for each processing node of the plurality of processing nodes, a transition-destination parameter that indicates a target processing node, among the plurality of processing nodes, to which processing is to transition in a case where data to be used in processing by the processing node is determined, based on the stored processing statuses, to be insufficient, and wherein the transition-destination parameter for each processing node is determined in advance based on a structure of the plurality of hierarchically connected processing nodes so that, for a fixed-size ring buffer corresponding to a processing node, an amount of data additionally stored in the fixed-size ring buffer is prevented from exceeding an amount of data stored in the fixed-size ring buffer that becomes discardable after being used in subsequent processing;

cyclically specifying, as a specified processing node, one of the processing nodes, from among the plurality of processing nodes, to perform the processing in an order based on hierarchy;

determining whether data to be used in processing by the specified processing node is sufficient for the processing by the specified processing node based on the processing statuses; and determining a processing node to perform the processing based on a result of determination and the transition-destination parameter for the specified processing node, wherein, in a case where the data to be used in the processing by the specified processing node is determined to be insufficient, determine the target processing node indicated by the transition-destination parameter for the specified processing node as the processing node to perform the processing, the target processing node being closer to an input side of the plurality of hierarchically connected processing nodes than the specified processing node.

13. The method according to claim 12 further comprising switching, in the case where the data to be used in the processing by the specified processing node is determined to be insufficient, from the specified processing node to the target processing node by overwriting a counter value used to cyclically specify the processing nodes with a value of the transition-destination parameter for the specified processing node.

14. The method according to claim 12, wherein the transition-destination parameter for each processing node is determined based on the structure of the plurality of hierarchically connected processing nodes, a size of data generated by processing of at least one processing node, and a size of data stored in a fixed-size ring buffer that becomes discardable after being used in subsequent processing.

15. The method according to claim 12, further comprising determining whether to perform the processing by the specified processing node further based on whether the one or more have an area available to store the processing result of the specified processing node.

16. A non-transitory computer-readable storage medium storing a program for causing a computer to perform a control method for controlling an apparatus having one or more memories including a plurality of fixed-size ring buffers respectively corresponding to a plurality of hierarchically connected processing nodes for sequentially performing processing of data by the plurality of hierarchically connected processing nodes, the method comprising:

storing, in each of the plurality of fixed-size ring buffers, processing results generated by a corresponding one of the plurality of processing nodes;

storing, in the one or more memories, processing statuses of the respective ones of the plurality of processing nodes and parameters for the respective ones of the plurality of processing nodes, wherein the parameters include, for each processing node of the plurality of processing nodes, a transition-destination parameter that indicates a target processing node, among the plurality of processing nodes, to which processing is to transition in a case where data to be used in processing by the processing node is determined, based on the stored processing statuses, to be insufficient, and wherein the transition-destination parameter for each processing node is determined in advance based on a structure of the plurality of hierarchically connected processing nodes so that, for a fixed-size ring buffer corresponding to a processing node, an amount of data additionally stored in the fixed-size ring buffer is prevented from exceeding an amount of data stored in the fixed-size ring buffer that becomes discardable after being used in subsequent processing;

cyclically specifying, as a specified processing node, one of the processing nodes, from among the plurality of processing nodes, to perform the processing in an order based on hierarchy;

determining whether data to be used in processing by the specified processing node is sufficient for the processing by the specified processing node based on the processing statuses; and determining a processing node to perform the processing based on a result of determination and the transition-destination parameter for the specified processing node, wherein, in a case where the data to be used in the processing by the specified processing node is determined to be insufficient, determine the target processing node indicated by the transition-destination parameter for the specified processing node as the processing node to perform the processing, the target processing node being closer to an input side of the plurality of hierarchically connected processing nodes than the specified processing node.

17. The non-transitory computer-readable storage medium according to claim 16 further comprising switching, in the case where the data to be used in the processing by the specified processing node is determined to be insufficient, from the specified processing node to the target processing node by overwriting a counter value used to cyclically specify the processing nodes with a value of the transition-destination parameter for the specified processing node.

18. The non-transitory computer-readable storage medium according to claim 16, wherein the transition-destination parameter for each processing node is determined based on the structure of the plurality of hierarchically connected processing nodes, a size of data generated by processing of at least one processing node, and a size of data stored in a fixed-size ring buffer that becomes discardable after being used in subsequent processing.

19. The non-transitory computer-readable storage medium according to claim 16, further comprising determining whether to perform the processing by the specified processing node further based on whether the one or more have an area available to store the processing result of the specified processing node.

* * * * *